US011521638B2

(12) United States Patent
Liu

(10) Patent No.: US 11,521,638 B2
(45) Date of Patent: Dec. 6, 2022

(54) AUDIO EVENT DETECTION METHOD AND DEVICE, AND COMPUTER-READABLE STORAGE MEDIUM

(71) Applicant: TENCENT TECHNOLOGY (SHENZHEN) COMPANY LIMITED, Guangdong (CN)

(72) Inventor: Haibo Liu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 231 days.

(21) Appl. No.: 16/671,684

(22) Filed: Nov. 1, 2019

(65) Prior Publication Data

US 2020/0066297 A1 Feb. 27, 2020

Related U.S. Application Data

(63) Continuation of application No. PCT/CN2018/100939, filed on Aug. 17, 2018.

(30) Foreign Application Priority Data

Sep. 6, 2017 (CN) .......................... 20171079265.2

(51) Int. Cl.
*G10L 25/30* (2013.01)
*G06N 3/08* (2006.01)
(Continued)

(52) U.S. Cl.
CPC ................ *G10L 25/30* (2013.01); *G06N 3/08* (2013.01); *G10L 15/063* (2013.01); *G10L 15/16* (2013.01)

(58) Field of Classification Search
CPC ....... G10L 25/30; G10L 15/063; G10L 15/16; G06N 3/08
See application file for complete search history.

(56) References Cited

U.S. PATENT DOCUMENTS 6,185,526 B1 * 2/2001 Kato ..................... G10L 19/005 704/227
9,653,093 B1 5/2017 Matsoukas et al.
(Continued)

FOREIGN PATENT DOCUMENTS

CN 104751842 A 7/2015
CN 105551483 A 5/2016
(Continued)

OTHER PUBLICATIONS

Translation of Chinese Patent Application Publication No. CN106157953, Published on Nov. 23, 2016 (Year: 2016).*
(Continued)

*Primary Examiner* — Bhavesh M Mehta
*Assistant Examiner* — Edward Tracy, Jr.
(74) *Attorney, Agent, or Firm* — Sughrue Mion, PLLC

(57) ABSTRACT

An audio event detection method including performing a framing processing on an audio to obtain audio data for each time period in the audio and extracting a specified feature vector from the audio data of each time period; inputting the specified feature vector of the audio data to a Recurrent Neural Network/Bidirectional Recurrent Neural Network (RNN/BI-RNN) model, to obtain a posterior probability of each pre-set audio event in the audio data of each time period; obtaining, for each time period, a target audio event of the audio data according to the posterior probability of each audio event in the audio data and a pre-set audio decoding algorithm; and extracting an optimal audio data sequence of the target audio event from the audio data of each time period.

17 Claims, 12 Drawing Sheets

(51) Int. Cl.
*G10L 15/06* (2013.01)
*G10L 15/16* (2006.01)

(56) References Cited

U.S. PATENT DOCUMENTS

| | | | | |
|---|---|---|---|---|
| 2006/0064301 | A1 | 3/2006 | Aguilar et al. | |
| 2014/0244248 | A1 | 8/2014 | Arisoy et al. | |
| 2016/0180838 | A1* | 6/2016 | Parada San Martin .. | G06N 3/02<br>704/232 |
| 2016/0335499 | A1* | 11/2016 | Tsai ........................ | G06K 9/627 |
| 2019/0103124 | A1* | 4/2019 | Zhang ..................... | G10L 15/20 |

FOREIGN PATENT DOCUMENTS

| | | | |
|---|---|---|---|
| CN | 106157953 | A | 11/2016 |
| CN | 107481728 | A | 12/2017 |

OTHER PUBLICATIONS

Lipton et al., "A Critical Review of Recurrent Neural Networks for Sequence Learning", Jun. 5, 2015 (Year: 2015).*
Office Action for corresponding CN 201710797265.2, dated Mar. 28, 2019.
Office Action for corresponding CN 201710797265.2, dated Sep. 25, 2019.
International Search Report for PCT/CN2018/100939, dated Nov. 21, 2018.

* cited by examiner

AUDIO EVENT DETECTION METHOD AND DEVICE, AND COMPUTER-READABLE STORAGE MEDIUM

CROSS-REFERENCE TO RELATED APPLICATIONS

This application is a continuation of International Patent Application No. PCT/CN2018/100939 filed on Aug. 17, 2018, which claims priority from Chinese Patent Application No. 201710797265.2, filed in the Chinese Patent Office on Sep. 6, 2017, the disclosures of which are incorporated herein by reference in their entireties.

BACKGROUND

1. Field

The present disclosure relates to the technical field of audio detection, and in particular, to an audio event detection method, a device, and a computer-readable storage medium.

2. Description of Related Art

In the era of information age, the amount of information exchange is increasing at an exponential rate. Due to continuous development of multimedia technologies and Internet technologies, the necessity for automatically analyzing and processing massive multimedia data is increasingly on demand, and such demand may be satisfied by analyzing the multimedia data more efficiently. For example, for a sports event, through automatically detecting audio events such as bravo, applause, cheers, and laughter, wonderful scenes, and extracting audios of the sports event, a user may easily find highlights of the sports event based on the user's interest.

Conventionally, common audio event detection methods included detecting an audio event in an audio based on a Gaussian Mixture Model (GMM) and detecting an audio event in an audio by using a Support Vector Machine (SVM). However, the present disclosure described below expands and improves the above conventional methods.

SUMMARY

According to an embodiment, there is provided an audio event detection method, the method including performing a framing processing on a to-be-detected audio to obtain audio data for each of a plurality of time periods in the to-be-detected audio and respectively extracting a specified feature vector from the audio data of each of the plurality of time periods; inputting the specified feature vector of the audio data of each of the plurality of time periods to a Recurrent Neural Network/Bidirectional Recurrent Neural Network (RNN/BI-RNN) model, to obtain a posterior probability of each pre-set audio event in the audio data of each of the plurality of time periods; obtaining, for each of the plurality of time periods, a target audio event of the audio data according to the posterior probability of each audio event in the audio data and a pre-set audio decoding algorithm; and extracting, for the target audio event of any one of the plurality of time periods, an optimal audio data sequence of the target audio event from the audio data of each of the plurality of time periods.

According to another embodiment, there is provided an audio event detection apparatus including at least one memory configured to store computer program code; and at least one processor configured to access the computer program code and operate as instructed by the computer program code, the computer program code including first framing and extraction code configured to cause the at least one processor to perform a framing processing on a to-be-detected audio to obtain audio data for each of a plurality of time periods in the to-be-detected audio and respectively extract a specified feature vector from the audio data of each of the plurality of time periods; inputting code configured to cause the at least one processor to input the specified feature vector of the audio data of each of the plurality of time periods to a Recurrent Neural Network/Bidirectional Recurrent Neural Network (RNN/BI-RNN) model, to obtain a posterior probability of each pre-set audio event in the audio data of each of the plurality of time periods; detection code configured to cause at least one processor to obtain, for each of the plurality of time periods, a target audio event of the audio data according to the posterior probability of each audio event in the audio data and a pre-set audio decoding algorithm, and extract, for the target audio event of any one of the plurality of time periods, an optimal audio data sequence of the target audio event from the audio data of each of the plurality of time periods.

According to another embodiment, there is provided a non-transitory computer-readable storage medium, storing executable instructions, the executable instructions capable of causing a computer to perform a framing processing on a to-be-detected audio to obtain audio data for each of a plurality of time periods in the to-be-detected audio and respectively extract a specified feature vector from the audio data of each of the plurality of time periods; input the specified feature vector of the audio data of each of the plurality of time periods to a Recurrent Neural Network/Bidirectional Recurrent Neural Network (RNN/BI-RNN) model, to obtain a posterior probability of each pre-set audio event in the audio data of each of the plurality of time periods; obtain, for each of the plurality of time periods, a target audio event of the audio data according to the posterior probability of each audio event in the audio data and a pre-set audio decoding algorithm; and extract, for the target audio event of any one of the plurality of time periods, an optimal audio data sequence of the target audio event from the audio data of each of the plurality of time periods.

DESCRIPTION OF EMBODIMENTS

To make the objectives, features, and advantages of the present disclosure clearer and more comprehensible, the following describes the technical solutions in the embodiments of the present disclosure with reference to the accompanying drawings. Apparently, the embodiments described herein are a part rather than all of the embodiments of the present disclosure. All other embodiments obtained by a person skilled in the art based on the embodiments of the present disclosure, without creative efforts, shall fall within the protection scope of the present disclosure.

Figure 1A:
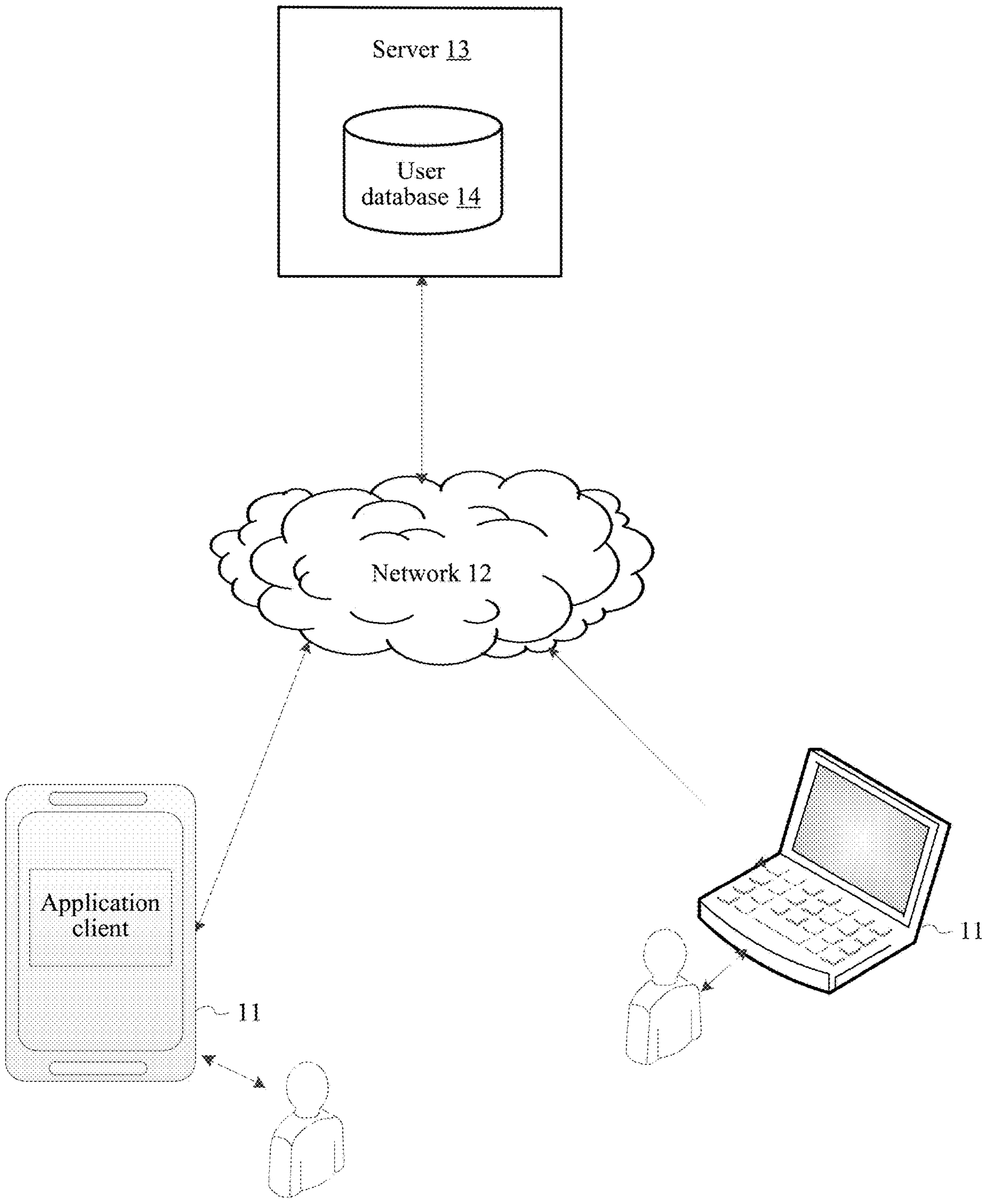
FIG. 1A is a system architecture diagram implementing an audio event detection method according to an embodiment.

FIG. 1A is a system architecture diagram implementing an audio event detection method according to an embodiment. As shown in FIG. 1A, the system architecture diagram of the audio event detection method may include at least a terminal device 11, a network 12, and a server 13. Furthermore, the system architecture diagram of the audio event detection method may further include a user database 14.

The terminal device 11 may be an intelligent device having a data computing and processing function, including, but not limited to, a smart phone installed with a communications module, a personal digital assistant (PDA), a tablet computer, and a personal computer. The terminal device 11 may be installed with an operating system, including, but not limited to, an Android operating system, a Symbian operating system, a Windows mobile operating system, and an Apple iPhone OS operating system. The terminal device 11 may be mounted with various application clients, for example, an application client capable of collecting a to-be-detected audio.

The network 12 may include a wired network and a wireless network. As shown in FIG. 1A, on a side of an access network, the device terminal 11 may access the network 12 in a wireless or wired manner. On a side of a core network, the server 13 may be connected to the network 12 in a wired manner. Alternatively, the server 13 may be connected to the network 12 in a wireless manner.

The server 13 may be a server of an application client and may be configured to receive to-be-detected audio collected by the application client and perform audio event detection based on the audio. The server 13 may be an independent server or may be a server cluster including a plurality of servers.

The server 13 may further include a user database 14 configured to store the to-be-detected audio captured by a user.

Figure 1B:
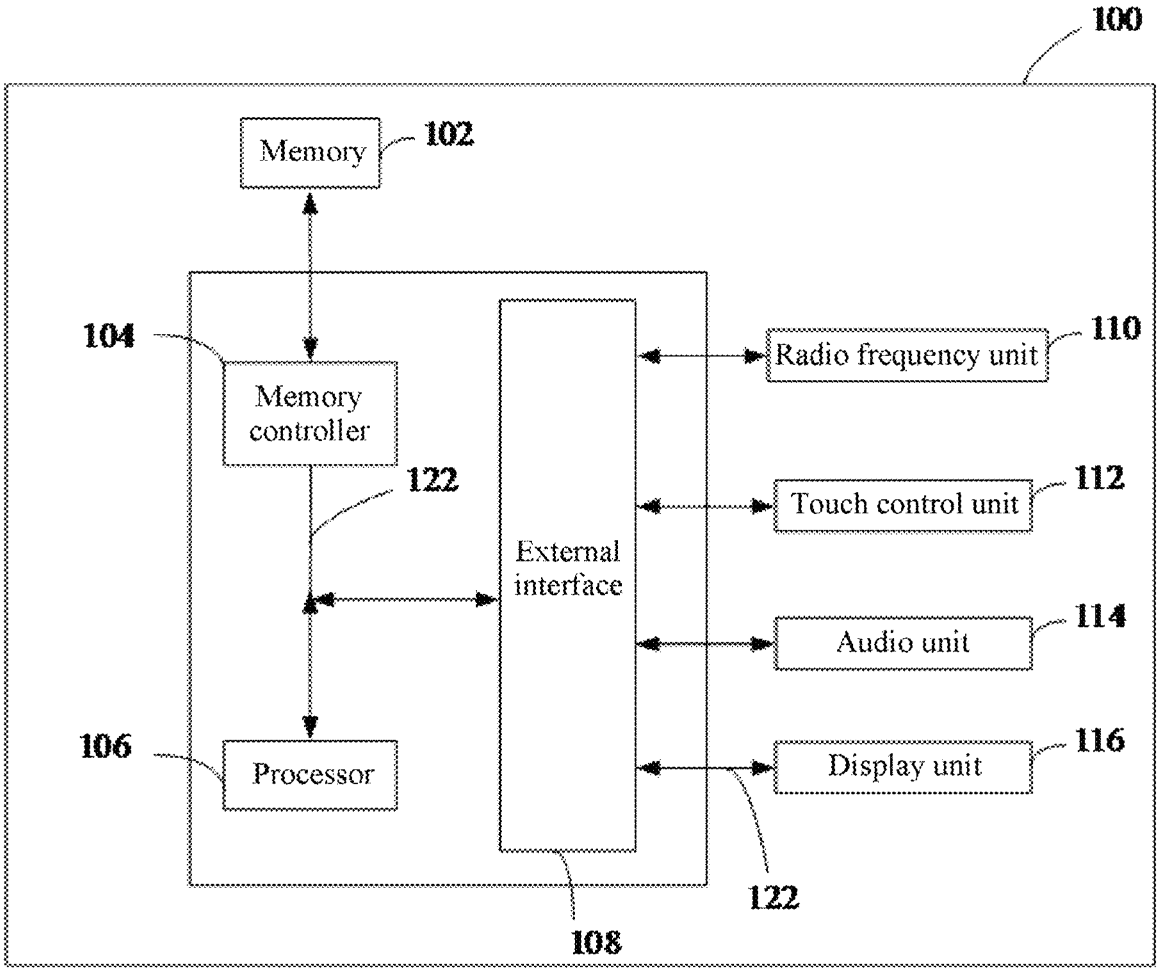
FIG. 1B is a structural block diagram of a computing device according to an embodiment.

FIG. 1B is a schematic structural diagram of a computing device 100. The computing device 100 may be the terminal device 11 or the server 13 in FIG. 1A. The audio event detection method may be applied to the computing device in FIG. 1B.

As shown in FIG. 1B, the computing device 100 may include a memory 102, a memory controller 104, one or more processors 106, an external interface 108, a radio frequency unit 110, a touch control unit 112, an audio unit 114, and a display unit 116. The components may perform communication with each other through one or more communication buses or signal lines 122.

The structure shown in FIG. 1B is only an example, and does not limit the structure of the computing device 100. For example, the computing device 100 may further include more or less components than those shown in FIG. 1B, or may have a configuration that is different from FIG. 1B. Each component shown in FIG. 1B may be implemented as hardware, software, or a combination thereof.

The memory 102 may be configured to store a computer program, for example, program instructions or modules corresponding to the audio event detection method. When executing the computer program in the memory 102, the processor 106 may implement each step of the audio event detection method shown in FIGS. 2 and 4.

The memory 102, that is, the computer-readable storage medium, may include a high-speed random memory, and may also include a nonvolatile memory, such as one or more magnetic storage apparatuses, a flash memory, or another nonvolatile solid-state memory. In some embodiments, the memory 102 may further include memories remotely disposed relative to the processor 106, and the remote memories may be connected to the computing device 100 through a network. Examples of the network may include, but are not limited to, the Internet, an intranet, a local area network, a mobile communications network, and a combination thereof. The processor 106 and other components may access the memory 102 under control of the memory controller 104.

The external interface 108 may couple various input/output apparatuses to the processor 106 and the memory 102. The processor 106 may run various software and instructions in the memory 102 to perform various functions of the mobile terminal 100 and perform data processing.

In some embodiments, the external interface 108, the processor 106, and the memory controller 104 may be implemented in a single chip. In other embodiments, they may be implemented by independent chips.

The radio frequency unit 110 may be configured to receive and send electromagnetic waves to implement conversion between electromagnetic waves and electric signals, to communicate with a communication network or other devices. The radio frequency unit 110 may include various existing circuit elements for performing the functions, for example, an antenna, a radio frequency transceiver, a digital signal processor, an encryption/decryption chip, a subscriber identity module (SIM), and a memory. The radio frequency unit 110 may communicate with various networks, such as Internet, Intranet, and a preset type of wireless network, or communicate with other devices through the preset type of wireless network.

The touch control unit 112 may provide an interface for a user to input to the computing device 100, and the user may perform a touch control operation on the touch control screen to make the computing device 100 perform different functions.

The audio unit 114 may provide an audio interface for a user, and may include one or more microphones, one or more speakers and an audio circuit. The audio circuit receives sound data from the external interface 108, converts the sound data to electric information, and transmits the electric information to the speaker. The speaker converts the electric information to sound waves heard by human ears. The audio circuit further receives the electric information from the microphone, converts the electric signal to sound data, and transmits the sound data to the external interface 108 to further be processed. Audio data may be obtained from the memory 102 or the radio frequency unit 110. Furthermore, the audio data may also be stored in the memory 102 or sent through the radio frequency unit 110. In some embodiments, the audio unit 114 may further include an earphone slot, for providing an audio interface for an earphone or other devices.

The display unit 116 may provide an output interface between the computing device 100 and the user. Specifically, the display unit 116 displays video outputs for the user, and contents of the video outputs may include text, pictures, videos, or any combination thereof. Some output results may correspond to some user interface objects.

An audio event detection method in this embodiment will be described below based on a system architectural diagram implementing the audio event detection method shown in FIG. 1A and the computing device in FIG. 1B.

The embodiment of the present disclosure provides an audio event detection method. In this method, a Recurrent Neural Network/Bi-directional Recurrent Neural Network (RNN/BI-RNN) obtained through training may be used to detect an audio event. An RNN model, when performing audio event detection, not only uses information at a current moment, but also uses information at a moment before the current moment. Furthermore, besides using the information at the current moment and the information at the moment before the current moment, a BI-RNN model further uses information at a moment after the current moment. The RNN/BI-RNN model has a stronger learning ability than GMM and SVM, and therefore, using the RNN/BI-RNN model having the stronger learning ability to detect an audio event may achieve better detection effects.

To better understand the technical solution in the embodiment of the present disclosure, the RNN model and the BI-RNN model will be described below.

The RNN/BI-RNN model may include an input layer, a hidden layer, and an output layer. A quantity of the hidden layers may be at least one. If the quantity of the hidden layers is only one, the RNN/BI-RNN model may be called as a single-layer RNN/BI-RNN model. If the quantity of the hidden layers is two or more, the RNN/BI-RNN model may be called as a multi-layer RNN/BI-RNN model. Furthermore, it should be noted that, a quantity of nodes included in the output layer and a quantity of nodes included in the hidden layer may be preset according an actual demand.

Figure 2:
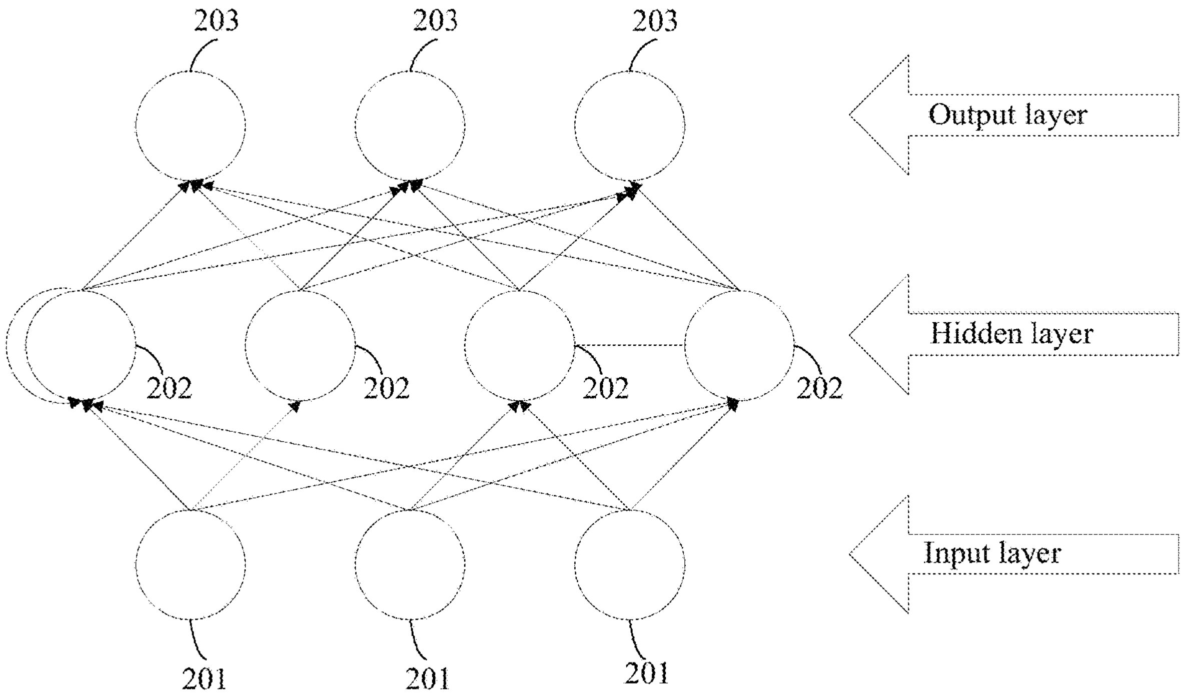
FIG. 2 is a principle diagram of a single-layer RNN model according to an embodiment.

FIG. 2 is a principle diagram of the single-layer RNN model. The single-layer RNN model may include an input layer, a hidden layer, and an output layer. As shown in FIG. 2, the input layer may include a plurality of input nodes 201, the hidden layer may include a plurality of hidden nodes 202, and the output layer may include a plurality of output nodes 203. When the RNN/BI-RNN model is used to detect an audio event, a specified feature vector of a to-be-detected audio may be determined to be the output layer, and each node 201 of the input layer represents a frame of audio data and the specified feature vector of the audio data.

Figure 3A:
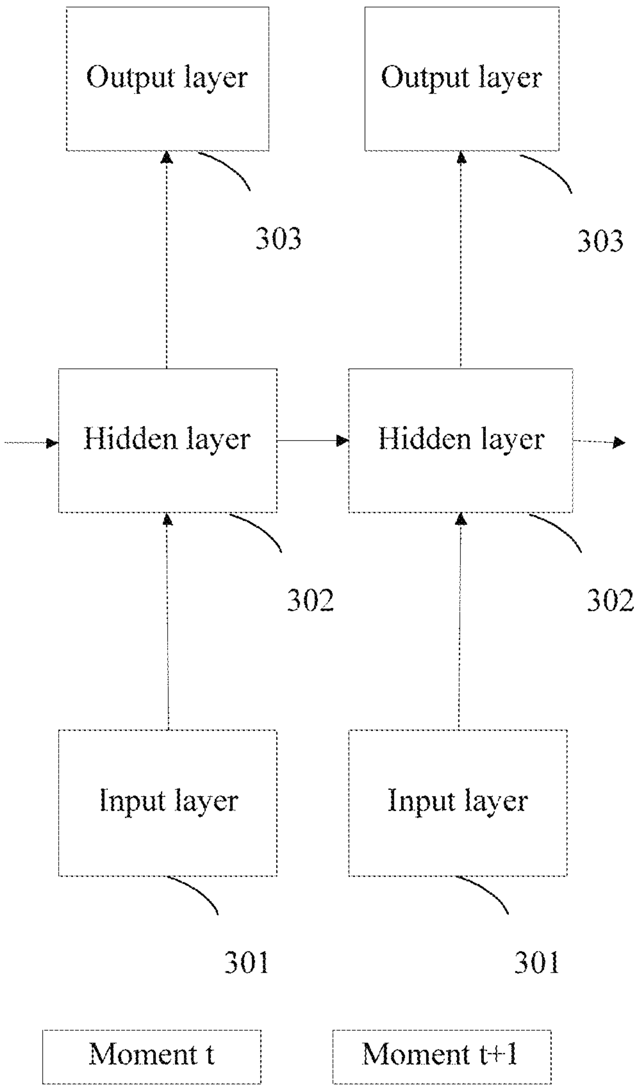
FIG. 3A is a schematic diagram of an RNN model according to an embodiment.
Figure 3B:
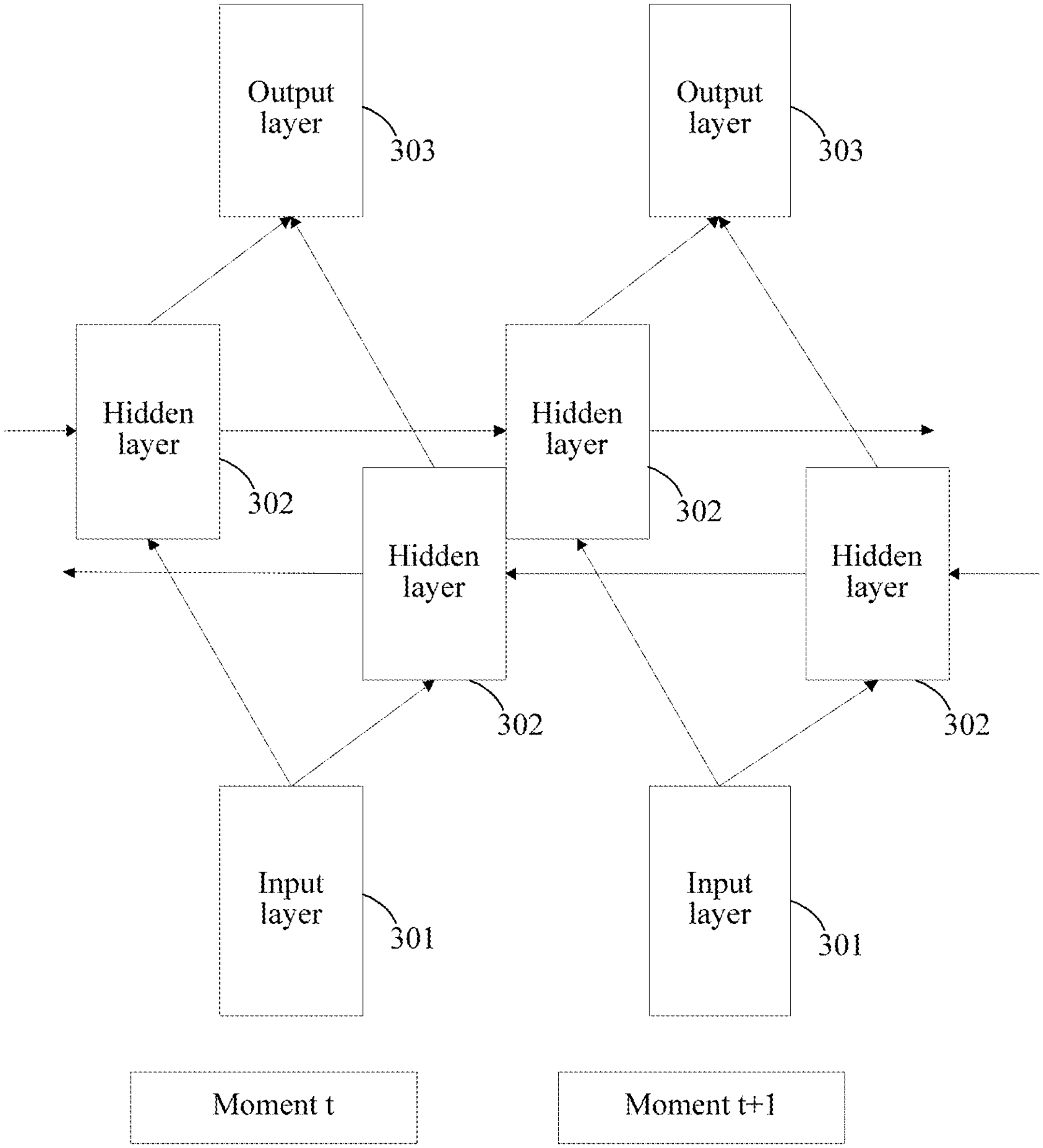
FIG. 3B is a schematic diagram of a BI-RNN model according to an embodiment.

FIG. 3A is a schematic diagram of the RNN model according to an embodiment. FIG. 3B is a schematic diagram of the BI-RNN model according to an embodiment. The input layer 301 inputs an input parameter to the hidden layer 302, and the output layer 303 outputs an output result.

In the RNN/BI-RNN model, the plurality of input nodes of the input layer may sequentially correspond to input parameters at different moments. For example, for input parameters at N moments, the input layer has N input nodes. That is, an input parameter at a first moment is input into a first input node, an input parameter at a second moment is input into a second input node, an input parameter at a third moment is input into a third input node, and inputs of input parameters at other moments may be deduced in a similar way. For the RNN model, a growth direction at a moment corresponding to an input node in the input layer may be consistent with an arrow direction (transmission direction) of the node in the hidden layer. When an audio event is detected by using the RNN/BI-RNN model, the input parameter may be a specified feature vector in the audio data.

Furthermore, a forward propagation and a backward propagation may be implemented in the RNN/BI-RNN model. The forward propagation may refer to propagation from the input layer to the hidden layer, and then to the output layer. Conversely, propagation in a direction opposite to the forward propagation is a reverse propagation, and a Back-Propagation Through Time (BPTT) algorithm is usually used in the reverse propagation.

As shown in FIG. 3A, during forward propagation of the RNN model, not only the information of the node at the current moment is used, but also the information of the node at a moment before the current moment may be used. In terms of time, based on use of the information of the node at the current time, the BI-RNN model not only uses the information of the node at a moment before the current moment, but also uses the information of the node at a moment after the current moment. Therefore, for the effect of detecting an audio event, the BI-RNN model is better than the RNN model. Specifically, the RNN model has the ability of learning by using the information at the moment before the current moment, and the BI-RNN model has the ability of learning by using the information at the moment before the current moment and the information at the moment after the current moment. Thus, the learning ability is stronger in the BI-RNN model, and the RNN/BI-RNN model may be used to detect an audio event based on the foregoing reasons for the better detection effects.

Figure 4:
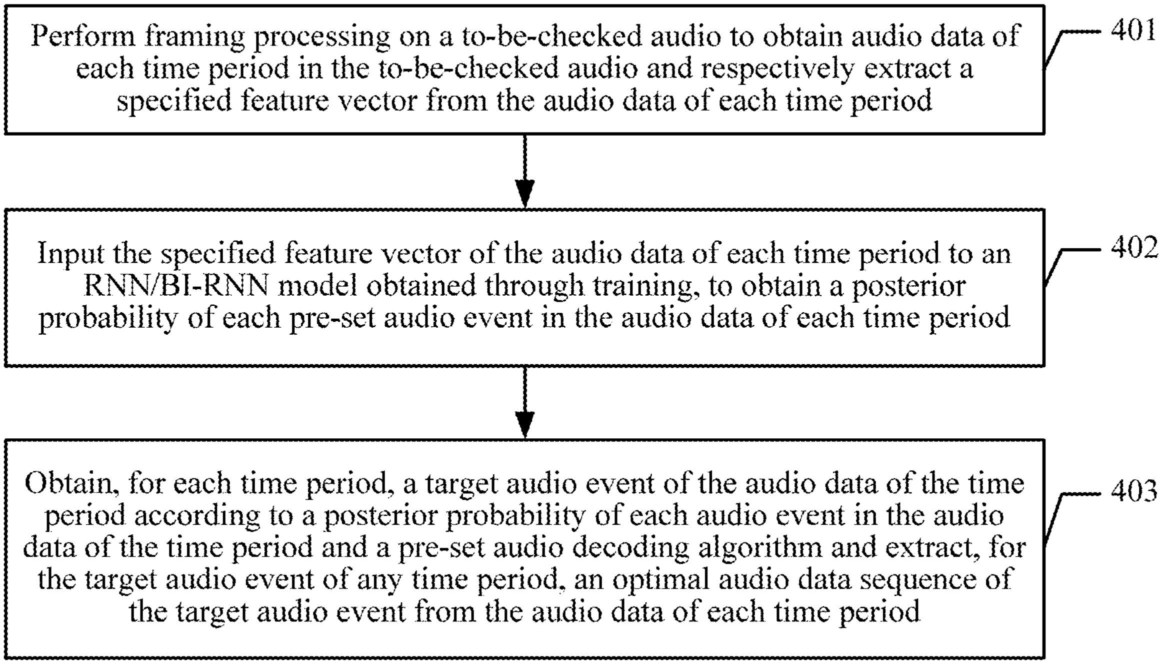
FIG. 4 is a schematic flowchart of an audio event detection method according to an embodiment.

FIG. 4 is a schematic flowchart of an audio event detection method according to an embodiment. The method may include the following steps.

In step 401, the method may perform framing processing on a to-be-checked audio to obtain audio data of each of a plurality of time periods in the to-be-checked audio and respectively extracting a specified feature vector from the audio data for each of the plurality of time periods.

An audio event may refer to different types of sounds, for example, men male voices, female voices, noises, singing voices, whistle, animal sounds, and cheers.

If audio event detection needs to be performed on an audio, framing processing needs to be performed on the to-be-checked audio. Specifically, the framing processing may be performed on the audio at an interval of N seconds. N is a positive integer and may be predetermined. For example, for a 10-second audio, an interval of framing may be set to 1 second, and after framing processing, ten 1-second audios may be obtained and arranged based on a time sequence in the audio, and numbered as different moments in sequence.

A specified feature vector may be extracted from the audio data for each of the plurality of time periods obtained through framing processing, and the specified feature vector may be a vector formed by at least one pre-specified feature. The specified feature may include a FilterBank (FBANK)

feature, an energy feature, a base frequency feature, and an eigenvoice feature. It may be understood that, a detection of an audio event in a manner of combining vectors of various types of features is more adapted to audio detection in a complicated environment than a detection of an audio event by using a single type of features. Therefore, embodiments of the present disclosure may detect the audio event more accurately, and avoid confusion among similar audio events.

In step 402, the method may input the specified feature vector of the audio data of each of the plurality of time periods to a RNN/BI-RNN model obtained through training, to obtain a posterior probability of each pre-set audio event in the audio data of each the plurality of time periods.

For example, a trained RNN/BI-RNN model needs to be used, and the RNN/BI-RNN model may be obtained based on a training audio and each preset audio event. The training video may be used to perform iterative training on the RNN/BI-RNN model, and each audio event may be preset. For example, an audio event may be preset to male voices, female voices, and singing voices. When the training of the RNN/BI-RNN model is performed by using the training audio, the training audio also needs to be framed, and a specified feature vector may be extracted from training audio data for each of the plurality of time periods obtained through framing. It may be understood that, the types of features included in the specified feature vector used during training may be the same as the types of features included in the specified feature vector used during performing audio event detection on the to-be-detected audio. The process of the RNN/BI-RNN model training will be described in detail in following embodiments.

The specified feature vector of the audio data of each of the plurality of time periods may be input to the RNN/BI-RNN model sequentially in an ascending order of moments, and the RNN/BI-RNN model may output a posterior probability of each audio event in the audio data of each of the plurality of time periods. The type of the audio event may be preset.

The posterior probability is a condition probability of appearance of various different preset audio events after the specified feature vector of the audio data is input under the conditions that the input layer, the hidden layer, and the output layer have been set in the RNN/BI-RNN model and various different audio events are preset.

In step 403, the method may obtain, for each of the plurality of time periods, a target audio event of the audio data of a time period according to a posterior probability of each audio event in the audio data of the time period and a pre-set audio decoding algorithm, and extract, for the target audio event of any time period, an optimal audio data sequence of the target audio event from the audio data of each of the plurality of time periods.

According to an embodiment, the posterior probability of each audio event in the audio data of each of the plurality of time periods and the preset audio decoding algorithm may be further used to detect the optimal audio data sequence of the audio event from the audio data of each of the plurality of time periods. Specifically, the audio data at a moment corresponding to each audio event may be detected from the audio data of each of the plurality of time periods, and the audio data of these moments may constitute a corresponding optimal audio data sequence corresponding to each audio event in a time sequence.

For example, in the audio data at 10 moments, the audio events correspondingly having a maximum posterior probability may be AAAAAABBBB. Here, the audio data at the former six moments is determined as an optimal audio data sequence of an audio event A and the audio data at the latter four moments is determined as an optimal audio data sequence of an audio event B.

Accordingly, the RNN/BI-RNN obtained through training may be used to detect an audio event. An RNN model, when performing audio event detection, not only uses information at a current moment, but also uses information at a moment before the current moment. Furthermore, besides using the information at the current moment and the information at the moment before the current moment, the BI-RNN model further uses information at a moment after the current moment. Therefore, the RNN/BI-RNN model has a stronger learning ability than GMM and SVM. Because the RNN/BI-RNN model having a stronger learning ability is used to detect an audio event, better detection effects may be achieved.

Figure 5:
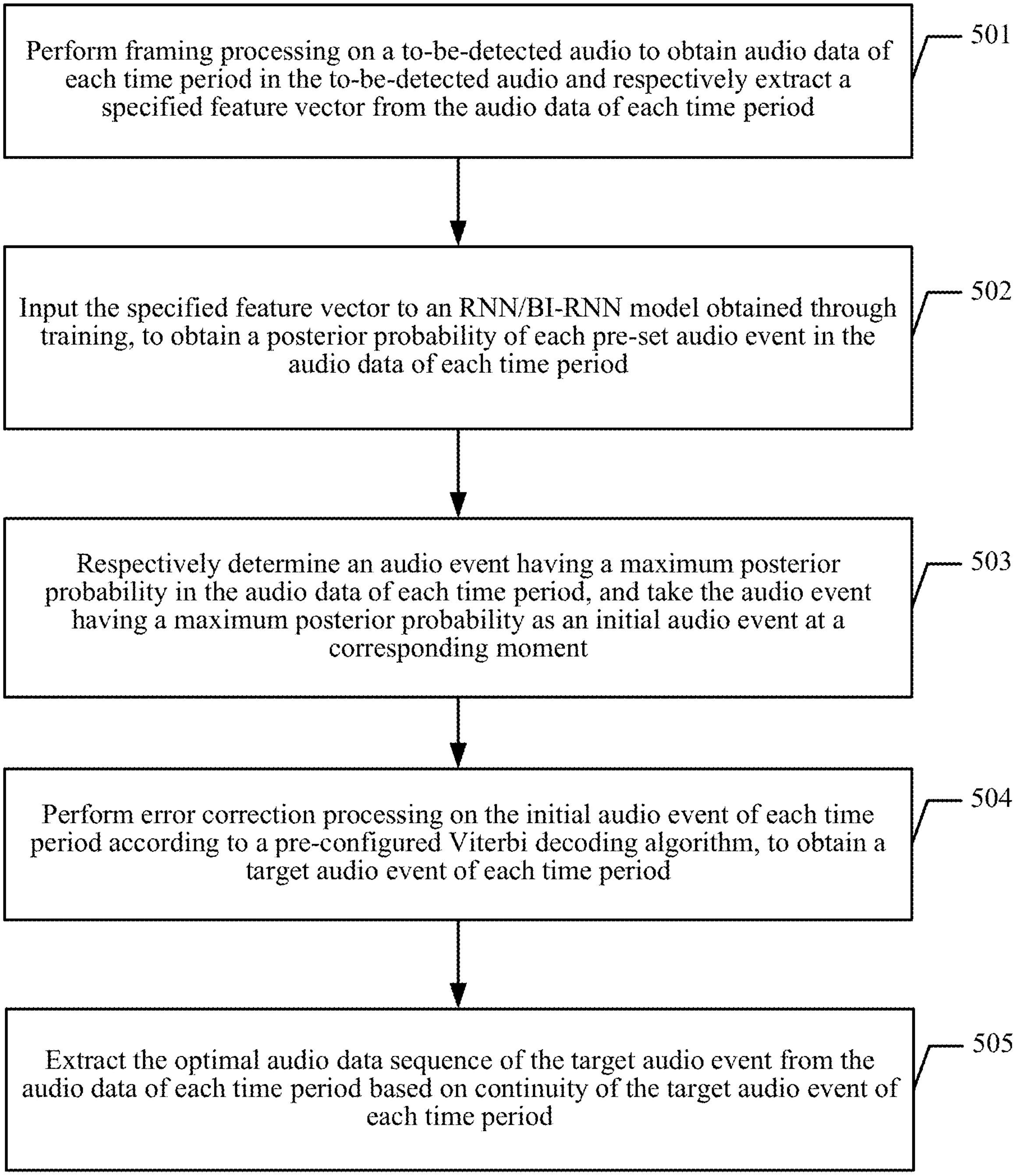
FIG. 5 is another schematic flowchart of an audio event detection method according to an embodiment.

FIG. 5 is another schematic flowchart of an audio event detection method according to an embodiment. The method may include the following steps.

In step 501, the method may perform framing processing on a to-be-detected audio to obtain audio data of each time period in the to-be-detected audio and respectively extract a specified feature vector from the audio data of each time period.

In step 502, the method may input the specified feature vector of the audio data of each time period to an RNN/BI-RNN model obtained through training, to obtain a posterior probability of each pre-set audio event in the audio data of each time period.

In step 503, the method may determine an audio event having a maximum posterior probability in the audio data for each time period, and take the audio event having a maximum posterior probability as an initial audio event at a corresponding moment.

In step 504, the method may perform error correction processing on the initial audio event for each time period according to a preset Viterbi decoding algorithm, to obtain a target audio event of each time period.

In step 505, the method may extract the optimal audio data sequence of the target audio event from the audio data of each time period based on continuity of the target audio event of each time period.

According to an embodiment, after the specified feature vector of the audio data of each time period is input to the RNN/BI-RNN model obtained through training, the output layer of the RNN/BI-RNN model outputs the posterior probability of each audio event in the audio data of each time period.

An audio event having a maximum posterior probability in the audio data of each time period may be determined in sequence, and the audio event having the maximum posterior probability may be determined as an initial audio event at a corresponding moment. For example, in the audio data at a moment t, a posterior probability of an audio event A is a, a posterior probability of an audio event B is b, and a posterior probability of an audio event D is d, and the posterior probabilities a b, and d may be compared. If the posterior probability of the audio event A is greater than the posterior probabilities of the audio events b and d, the initial audio event at the moment t is determined to be the audio event A.

The Viterbi decoding algorithm may be used to perform error correction on a target audio event of each time period, and the algorithm may determine an initial audio event of each time period in sequence, to avoid a situation where the incorrect audio event corresponding to the maximum posterior probability at the current moment is used as a final result to determine an optimal audio data sequence. For example, at moments t−1, t, and t+1, the posterior probabilities of male voices are 0.3, 0.6, and 0.3, respectively, and the posterior probabilities of female voices are 0.5, 0.5, and 0.5, respectively. The initial audio events of the three moments t−1, t, and t+1 may be woman voice, man voice, and woman voice, respectively. However, generally, the types of the audio events should be continuous at three continuous moments, and the sequence of woman voice, man voice, and woman voice does not meet a continuous situation. Thus, in such situation, after the Viterbi algorithm is used, the target audio events at the three moments are corrected to be woman voice, woman voice, and woman voice.

Furthermore, the optimal audio data sequence of the target audio event may be extracted from the audio data of each time period based on the continuity of a target audio event of each time period. For example, in the audio data at 10 moments, the corresponding target audio events may be in the sequence of AAAAAABBBB. That is, the audio data at the former six moments is determined as an optimal audio data sequence of a target audio event A and the audio data at the latter four moments is determined as an optimal audio data sequence of a target audio event B.

According to an embodiment, after the initial audio event of each time period is obtained by using the trained RNN/BI-RNN model, the error correction may be performed on the initial audio event of each time period by using the Viterbi decoding algorithm, to obtain the target audio event of each time period and to avoid an error on an audio event at a certain moment, and thus, achieving better detection effects of an audio event.

It should be noted that, the embodiments shown in FIGS. 4 and 5 describe detection of an audio event by using the trained RNN/BI-RNN model. To better understand the technical solution of the present disclosure, the training method of the RNN/BI-RNN model is emphatically introduced.

Figure 6:
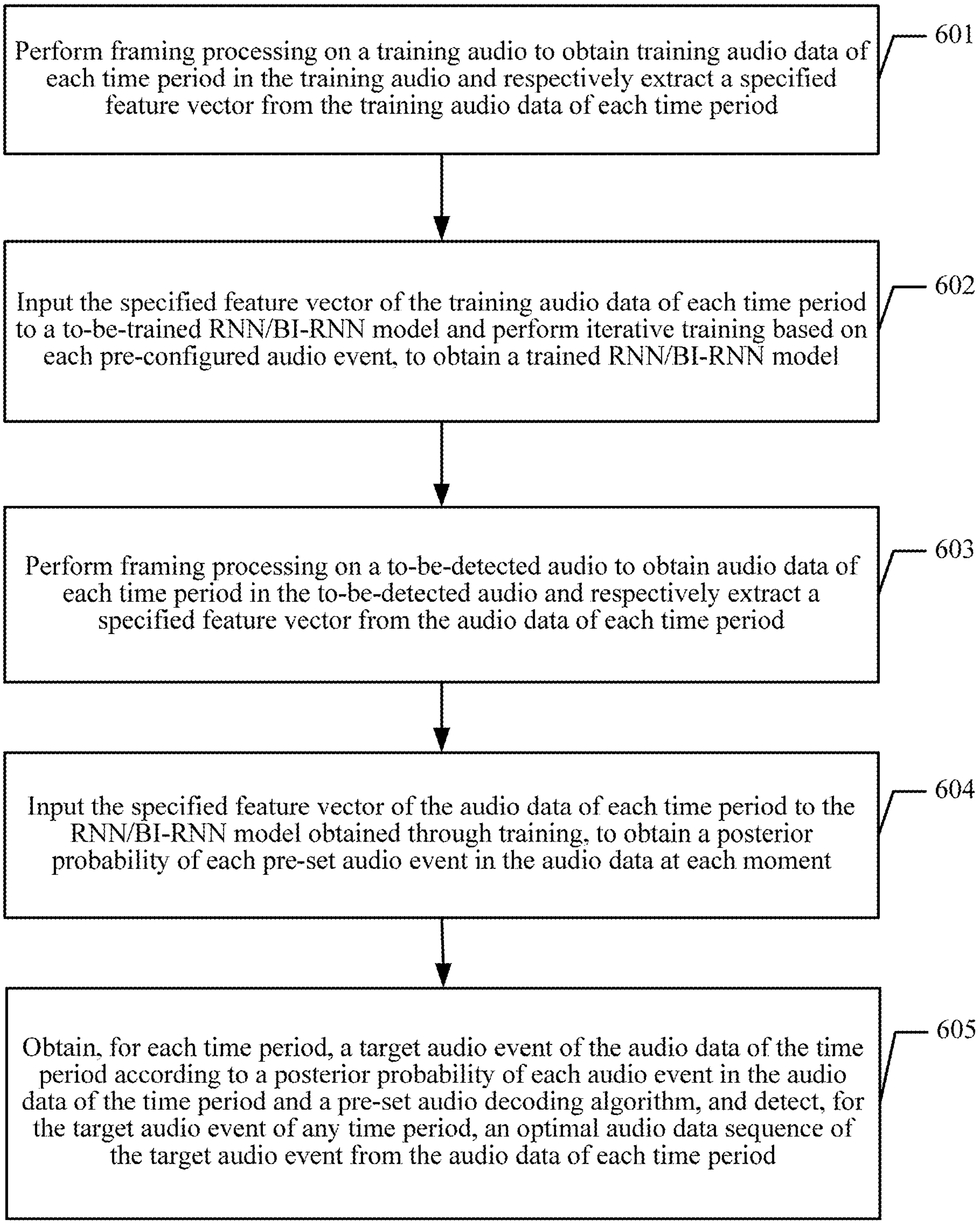
FIG. 6 is another schematic flowchart of an audio event detection method according to an embodiment.

FIG. 6 is another schematic flowchart of an audio event detection method according to an embodiment of the present disclosure. The method may include the following steps.

In step 601, the method may perform a framing processing on the training audio to obtain training audio data of each time period in the training audio and extract a specified feature vector from the training audio data of each time period.

In step 602, the method may input the specified feature vector of the training audio data of each time period to a to-be-trained RNN/BI-RNN model and perform iterative training based on each preset audio event, to obtain a trained RNN/BI-RNN model.

In step 603, the method may perform a framing processing on a to-be-detected audio to obtain audio data of each time period in the to-be-detected audio and extract a specified feature vector from the audio data of each time period.

In step 604, the method may input the specified feature vector of the audio data of each time period to the RNN/BI-RNN model obtained through training, to obtain a posterior probability of each pre-set audio event in the audio data of each time period.

In step 605, the method may obtain, for each time period, a target audio event of the audio data of the time period according to a posterior probability of each audio event in the audio data of the time period and a pre-set audio decoding algorithm, and extract, for the target audio event of any time period, an optimal audio data sequence of the target audio event from the audio data of each time period.

It may be understood that, the steps 603 to 605 are respectively similar to those described in steps 401 to 403 in FIG. 4 and the content of step 605 may be obtained with reference to steps 503 to 505.

In particular, the RNN/BI-RNN model needs to be trained first. During training, a training audio may be used, and frame processing may be performed on the training audio. A specified feature vector may be extracted from the training audio data for each time period obtained through framing processing. A type of feature included in the specified feature vector in FIG. 6 is the same as the type of feature included in the specified feature vector in FIG. 4.

If an RNN model is trained, the specified feature vector of the training audio data of each time period may be input to a to-be-trained RNN model and iterative training may be performed based on each preset audio event to obtain a trained RNN model.

Figure 7:
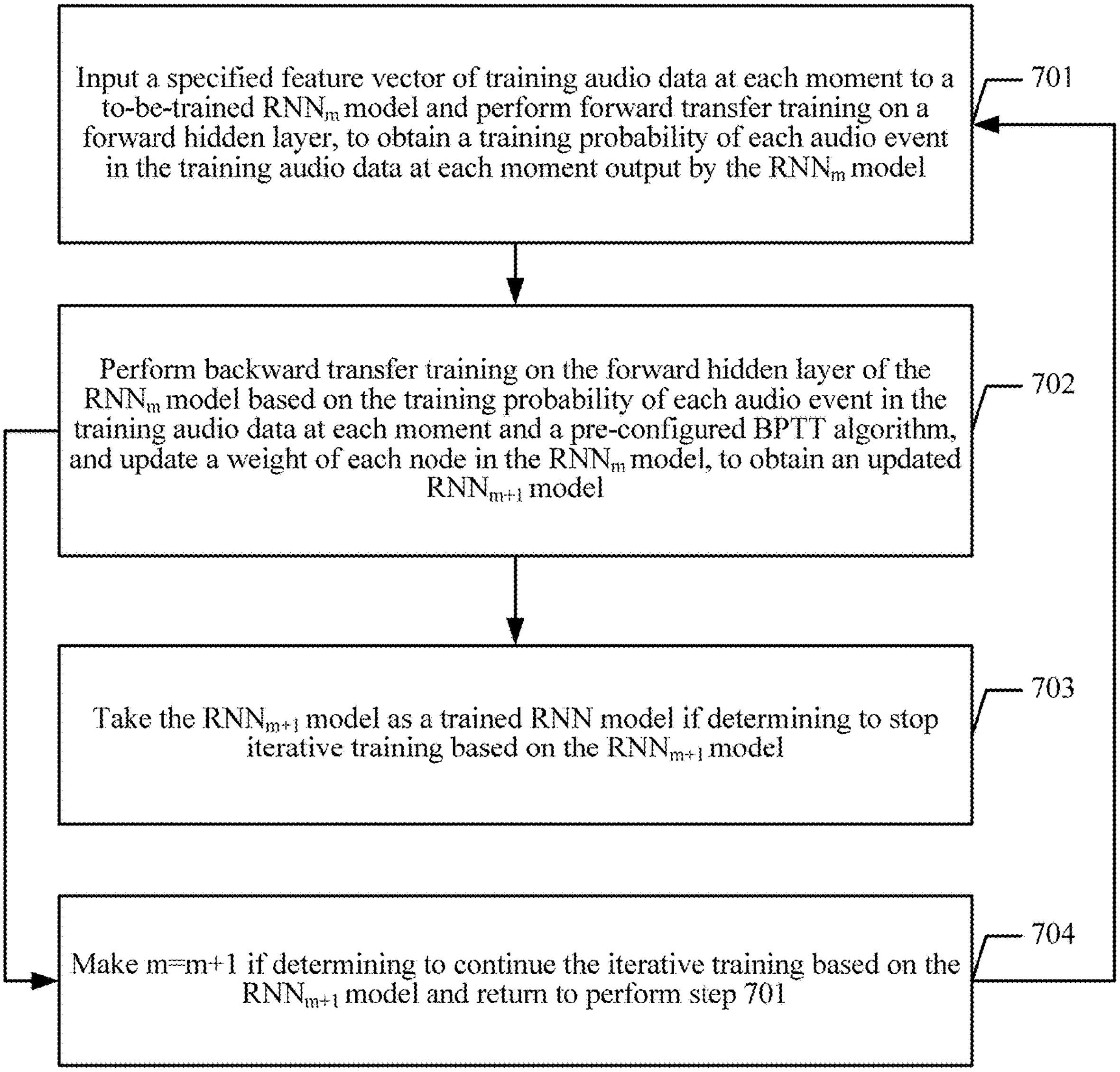
FIG. 7 is a schematic flowchart of an RNN model training according to an embodiment.

FIG. 7 is a schematic flowchart of RNN model training according to an embodiment. The method may include the following steps In step 701, the method may input the specified feature vector of the training audio data of each time period to a to-be-trained $RNN_m$ model and perform forward propagation training on a forward hidden layer to obtain a training probability of each audio event in the training audio data of each time period output by the $RNN_m$ model.

In this embodiment, an RNN model that is not trained may be referred to as an initial to-be-trained model and may be marked as an $RNN_0$ model. Here, 0 represents that a number of times that the $RNN_0$ model has been trained is 0. If a number of times that the RNN model has been trained is m, then an $RNN_m$ model that has been trained for m times may be obtained. It should be noted that, a weight of each node in the $RNN_0$ model may be set in advance.

A specified feature vector of training audio data of each time period may be input to the to-be-trained $RNN_m$ model and forward propagation training may be performed on a forward hidden layer to obtain a training probability of each audio event in the training audio data of each time period output by the $RNN_m$ model.

A forward propagation at a moment t is taken as an example. The following formulas may be specifically used for the forward propagation training:

$$a_h^t = \sum_{i=1}^{I} w_{ih} x_i^t + \sum_{h'=1}^{H} w_{h'h} b_{h'}^{t-1}$$

$$b_h^t = f(a_h^t) = \exp(a_h^t) \Big/ \sum_{k'=1}^{K} \exp(a_h^t)$$

$a_h^t$ represents a value at a $h^{th}$ node at a moment t, I represents a total quantity of dimensions of a specified feature vector at the moment t, $w_{th}$ represents a weight of a $i^{th}$ dimension at the $h^{th}$ node, $x_i^t$ represents a feature value of the $i^{th}$ dimension in the specified feature vector at the moment t, H represents a total quantity of nodes of a hidden layer in the RNN/BI-RNN model, $w_{h'h}$ represents a weight of a $h'^{th}$ node to the $h^{th}$ node, $b_h^t$ represents an output value of the specified feature vector at the $h^{th}$ node at the moment t, and K represents a total quantity of preset audio events.

In step 702, the method may perform a backward propagation training on the forward hidden layer of the $RNN_m$ model based on the training probability of each audio event in the training audio data of each time period and a preset BPTT algorithm, and update a weight of each node in the $RNN_m$ model to obtain an updated $RNN_{m+1}$ model.

The moment t may be taken as an example, and the reverse propagation training updates a weight of a node by using following formulas:

$$BPTT\ \text{algorithm: } \delta_h^t = f'(a_h^t)\left(\sum_{k=1}^{K}\delta_k^t w_{hk} + \sum_{h'=1}^{H}\delta_{h'}^{t+1} w_{hh'}\right)$$

$$\text{Gradient algorithm of a weight: } \frac{\partial O}{\partial w_{ih}^t} = \sum_{t=1}^{T}\delta_h^t b_{ih}^t$$

$$\text{Updating algorithm of a weight: } w_{ih}^{t+1} = w_{ih}^t - \eta\frac{\partial O}{\partial w_{ih}^{t+1}}$$

$\delta_h^t$ represents an output value at the $h^{th}$ node at a moment t obtained based on the BPTT algorithm, f' represents a preset excitation function, $a_h^t$ represents a value at the $h^{th}$ node at the moment t in the forward propagation training, K represents a total quantity of preset audio events, $\delta_k^t$ represents an output value of a $k^{th}$ audio event on an output layer at the moment t, $w_{hk}$ represents a weight of the $k^{th}$ audio event at the $h^{th}$ node, H represents a total quantity of nodes in a hidden layer in an RNN/BI-RNN model, and $w_{h'h}$ represents a weight from a $h'^{th}$ node to the $h^{th}$ node.

$$\frac{\partial O}{\partial w_{ih}^t}$$

represents a gradient of a weight of a $i^{th}$ dimension of the specified feature vector at the $h^{th}$ node at the moment t.

T represents a total quantity of moments, $b_{th}^t$ represents an output value of the $i^{th}$ dimension of the specified feature vector at the $h^{th}$ node at the moment t, $w_{th}^{t+1}$ represents an updated weight of the $i^{th}$ dimension of the specified feature vector at the $h^{th}$ node at a moment t+1, and $\eta$ represents a learning rate, where a value of t is decreased from T.

$$\delta_k^t = b_k^t - z_k^t$$

$\delta_k^t$ represents an output value of a $k^{th}$ audio event at an output layer at the moment t, $b^t$ represents a training probability of outputting a node in the hidden layer adjacent to an output node at the moment t to the $k^{th}$ audio event of the output node, $z_k^t$ represents a target probability of the $k^{th}$ audio event of the preset output node at the moment t. That is, $\delta_k^t$ represents an error value.

It should be noted that, O represents a target function, the target function may be a minimum mean square error or a maximum interactive entropy. The interactive entropy may be defined as:

$$O = -\sum_{k=1}^{K} z_k \log b_k$$

K represents a total quantity of preset audio events, $z_k$ represents a collection of a target probability of each audio event output by an output node of each time period that is preset, and $b_k$ represents a collection of a training probability of a $k^{th}$ audio event finally output by the forward propagation.

In step 703, the method may take the $RNN_{m+1}$ model as a trained RNN model if it determines to stop the iterative training based on the $RNN_{m+1}$ model.

In step 704, the method may update m=m+1 if it determines to continue the iterative training based on the $RNN_{m+1}$ model, and return to perform step 701.

After the $RNN_{m+1}$ model is obtained, the method determines whether to stop the iterative training. Specifically, a standard audio may be used, and the framing processing may be performed on the standard audio to obtain standard audio data of each time period. The specified feature vector may be extracted from the standard audio data of each time period, the specified feature vector of the standard audio data of each time period then may be input to the $RNN_{m+1}$ model to obtain an output value of each audio event of each time period that is output, and an output value of each audio event of each time period may be respectively compared with a preset standard value of each audio event of each time period to obtain a difference, a maximum value of absolute values of all the differences compared with a preset difference. Further, the iterative training may be determined to be continued if the maximum value is greater than or equal to the preset difference, and the iterative training may be determined to be stopped if the maximum value is less than the preset difference.

If the iterative training is determined to be stopped based on the $RNN_{m+1}$ model, it represents that the training process has been finished, and that the $RNN_{m+1}$ model is determined to be a final RNN model after training. Based on such determination, the RNN model may be used to perform audio event detection on a to-be-detected audio.

The method may update m=m+1 if it determines to continue the iterative training based on the $RNN_{m+1}$ model, and may return to perform step 701.

The iterative training is performed on the RNN model to obtain a better RNN model in a multi-iteration manner and achieve better detection effects when performing audio event detection by using the RNN model.

If a BI-RNN model is trained, the specified feature vector of the training audio data of each time period may be input to a to-be-trained BI-RNN model and iterative training may be performed based on each preset audio event to obtain a trained BI-RNN model.

Figure 8:
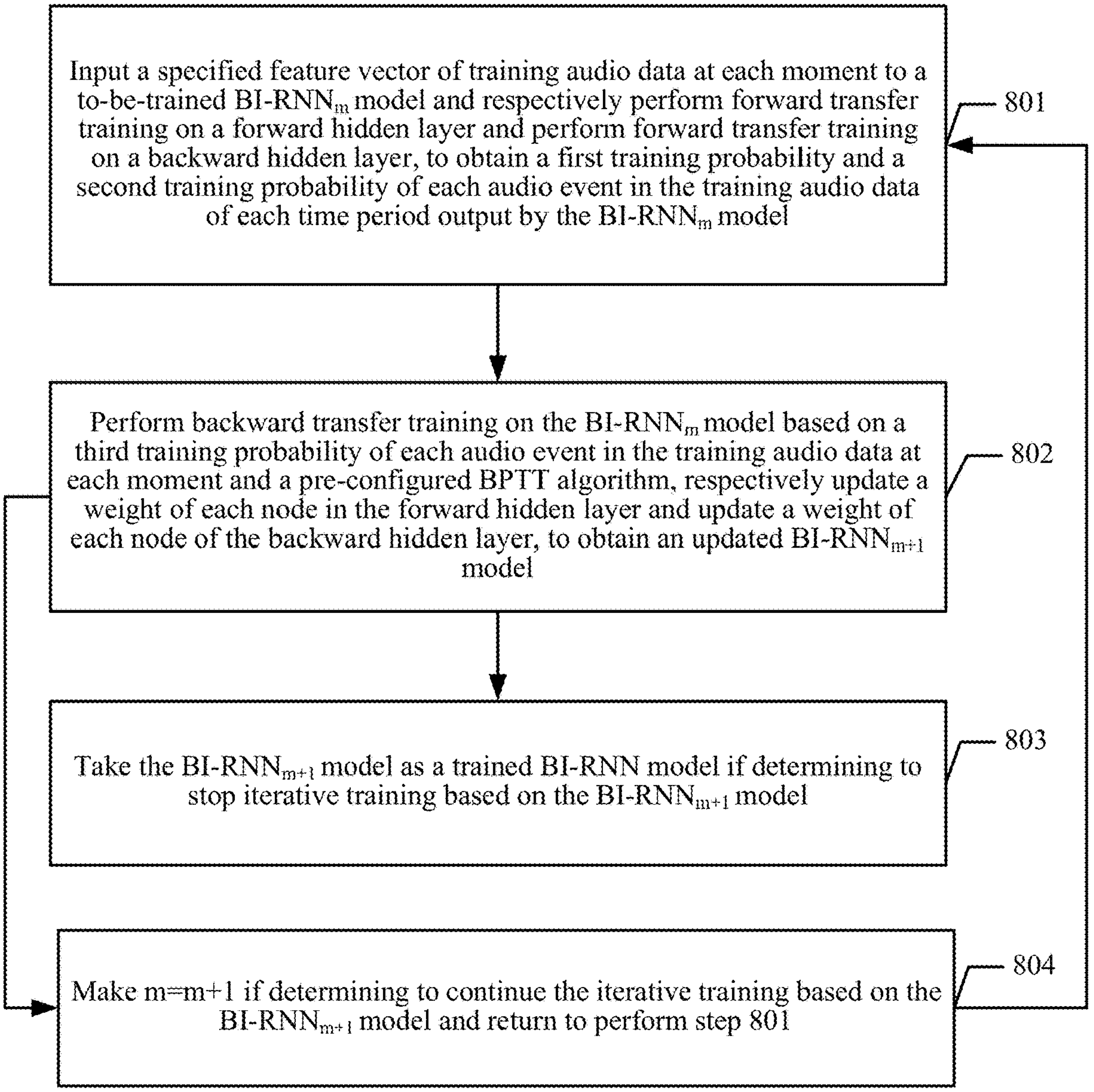
FIG. 8 is a schematic flowchart of a BI-RNN model training according to an embodiment.

FIG. 8 is a schematic flowchart of BI-RNN model training according to an embodiment. The method may include the following steps.

In step 801, the method may input the specified feature vector of the training audio data of each time period to a to-be-trained $BI\text{-}RNN_m$ model and respectively perform forward propagation training on a forward hidden layer and perform forward propagation training on a backward hidden layer to obtain a first training probability and a second training probability of each audio event in the training audio data of each time period output by the $BI\text{-}RNN_m$ model.

A BI-RNN model that is not trained may be referred to as an initial to-be-trained model and may be marked as a $BI\text{-}RNN_0$ model. 0 represents that a number of times that the $BI\text{-}RNN_0$ model has been trained is 0. If m is a number of times that the $BI\text{-}RNN_m$ model has been trained, the $BI\text{-}RNN_m$ model that has been trained for m times may be obtained. It should be noted that, a weight of each node in the $RNN_0$ model may be set in advance.

The forward hidden layer may refer to a hidden layer during propagation from a moment 1 to a moment T, and a regression hidden layer may refer to a hidden layer during propagation from the moment T to the moment 1.

The forward propagation training may be performed on the forward hidden layer from t=1 to t=T by using the specified feature vector of the training audio data of each time period to obtain a first training probability of each audio event in the training audio data of each time period, and the forward propagation training may be performed on the regression hidden layer from t=T to t=1 to obtain a second training probability of each audio event in the training audio data of each time period.

The forward propagation training on the forward hidden layer or the forward propagation training on the regression hidden layer may use the following formulas:

$$a_h^t = \sum_{i=1}^{I} w_{ih} x_i^t + \sum_{h'=1}^{H} w_{h'h} b_{h'}^{t-1}$$

$$b_h^t = f(a_h^t) = \exp(a_h^t) \Big/ \sum_{k'=1}^{K} \exp(a_h^t)$$

$a_h^t$ represents a value at a $h^{th}$ node at a moment t, I represents a total quantity of dimensions of a specified feature vector at the moment t, $w_{ih}$ represents a weight of a $i^{th}$ dimension at the $h^{th}$ node, $x_i^t$ represents a feature value of the $i^{th}$ dimension in the specified feature vector at the moment t, H represents a total quantity of nodes of a hidden layer in the RNN/BI-RNN model, $w_{h'h}$ represents a weight of a $h'^{th}$ node to the $h^{th}$ node, $b_h^t$ represents an output value of the specified feature vector at the $h^{th}$ node at the moment t, and K represents a total quantity of preset audio events.

In step 802, the method may perform a backward propagation training on the $\text{BI-RNN}_m$ model based on a third training probability of each audio event in the training audio data of each time period and a preset BPTT algorithm, and update a weight of each node in the forward hidden layer and a weight of each node of the backward hidden layer to obtain an updated $\text{BI-RNN}_{m+1}$ model.

The first training probability and the second training probability of each audio event in the training audio data of each time period may be added, and the sum, referred to as the third training probability, is determined as an actual output probability of each audio event in the training audio data of each time period.

For example, at a moment t, the backward propagation training on the forward hidden layer or the backward propagation training on the regression hidden layer may use the following formulas:

$$\textit{BPTT}\text{ algorithm: } \delta_h^t = f'(a_h^t)\left(\sum_{k=1}^{K} \delta_k^t w_{hk} + \sum_{h'=1}^{H} \delta_{h'}^{t+1} w_{hh'}\right)$$

$$\text{Gradient algorithm of a weight: } \frac{\partial O}{\partial w_{ih}^t} = \sum_{t=1}^{T} \delta_h^t b_{ih}^t$$

$$\text{Updating algorithm of a weight: } w_{ih}^{t+1} = w_{ih}^t - \eta \frac{\partial O}{\partial w_{ih}^{t+1}}$$

$\delta_h^t$ represents an output value at the $h^{th}$ node at a moment t obtained based on the BPTT algorithm, $f'$ represents a preset excitation function, $a_h^t$ represents a value at the $h^{th}$ node at the moment t in the forward propagation training, K represents a total quantity of preset audio events, $\delta_k^t$ represents an output value of a $k^{th}$ audio event on an output layer at the moment t, $w_{hk}$ represents a weight of the $k^{th}$ audio event at the $h^{th}$ node, H represents a total quantity of nodes in a hidden layer in an RNN/BI-RNN model, and $w_{h'h}$ represents a weight from a $h'^{th}$ node to the $h^{th}$ node.

$$\frac{\partial O}{\partial w_{ih}^t}$$

represents a gradient of a weight of a $i^{th}$ dimension of the specified feature vector at the $h^{th}$ node at the moment t.

T represents a total quantity of moments, $b_{ih}^t$ represents an output value of the $i^{th}$ dimension of the specified feature vector at the $h^{th}$ node at the moment t, $w_{ih}^{t+1}$ represents an updated weight of the $i^{th}$ dimension of the specified feature vector at the $h^{th}$ node at a moment t+1, and $\eta$ represents a learning rate, where a value of t is decreased from T.

$$\delta_k^t = b_k^t - z_k^t$$

$\delta_k^t$ represents an output value of a $k^{th}$ audio event at an output layer at the moment t, $b^t$ represents a third training probability of outputting a node in the hidden layer adjacent to an output node at the moment t to the $k^{th}$ audio event of the output node, $z_k^t$ represents a target probability of the $k^{th}$ audio event of the preset output node at the moment t. That is, $\delta_k^t$ represents an error value.

It should be noted that, O represents a target function, the target function may be a minimum mean square error or a maximum interactive entropy. The interactive entropy may be defined as:

$$O = -\sum_{k=1}^{K} z_k \log b_k$$

K represents a total quantity of preset audio events, $z_k$ represents a collection of a target probability of each audio event output by an output node of each time period that is preset, and $b_k$ represents a collection of a training probability of a $k^{th}$ audio event finally output by the forward propagation.

In step 803, the method may use the $\text{BI-RNN}_{m+1}$ model as a trained BI-RNN model if it determines to stop the iterative training based on the $\text{BI-RNN}_{m+1}$ model.

In step 804, the method may update m=m+1 if it determines to continue the iterative training based on the $\text{BI-RNN}_{m+1}$ model and may return to step 801.

After the $\text{BI-RNN}_{m+1}$ model is obtained, the method determines whether to stop the iterative training. Specifically, a standard audio may be used, and the framing processing may be performed on the standard audio to obtain standard audio data of each time period. The specified feature vector may be extracted from the standard audio data of each time period, the specified feature vector of the standard audio data of each time period may be input to the $\text{BI-RNN}_{m+1}$ model to obtain an output value of each audio event of each time period that is output. An output value of each audio event of each time period may be respectively compared with a preset standard value of each audio event of each time period to obtain a difference, a maximum value of absolute values of all the differences compared with a preset difference, and the iterative training may be determined to be continued if the maximum value is greater than or equal to the preset difference, and the iterative training may be determined to be stopped if the maximum value is less than the preset difference.

If the iterative training is determined to be stopped based on the $\text{BI-RNN}_{m+1}$ model, it represents that the training process has finished, and the $\text{BI-RNN}_{m+1}$ model is determined to be a final RNN model after training, and the BI-RNN model is used to perform audio event detection on a to-be-detected audio.

If determining to continue the iterative training based on the $BI\text{-}RNN_{m+1}$ model, the method may update m=m+1, and return to perform step 801.

According to an embodiment, the iterative training may be performed on the BI-RNN model to obtain a better BI-RNN model in a multi-iteration manner and achieve better detection effects when performing audio event detection by using the BI-RNN model.

Figure 9:
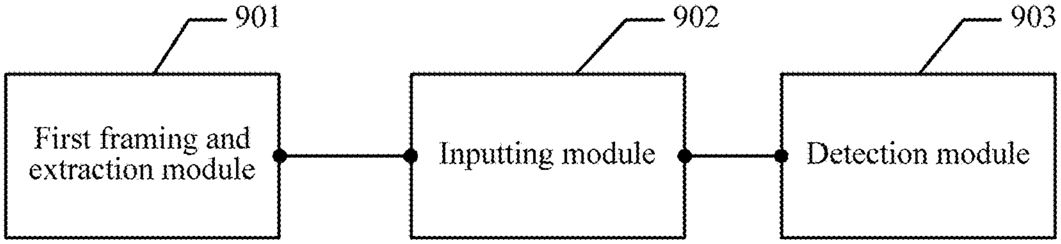
FIG. 9 is another schematic structural diagram of a program module of an audio event detection device according to an embodiment.

FIG. 9 is another schematic structural diagram of a program module of an audio event detection apparatus according to an embodiment. The program may include a first framing and extraction module 901 configured to perform framing processing on a to-be-detected audio to obtain audio data of each time period in the to-be-detected audio and respectively extract a specified feature vector from the audio data of each time period; an inputting module 902 configured to input the specified feature vector of the audio data of each time period to a Recurrent Neural Network/Bidirectional Recurrent Neural Network (RNN/BI-RNN) model obtained through training, to obtain a posterior probability of each pre-set audio event in the audio data of each time period, RNN/BI-RNN model being obtained based on a training audio and each audio event; a detection module 903 configured to obtain, in each time period, a target audio event of the audio data of the time period according to the posterior probability of each audio event in the audio data of the time period and a pre-set audio decoding algorithm; and the detection module further configured to extract, for the target audio event of any time period, an optimal audio data sequence of the target audio event from the audio data of each time period.

An audio event may refer to different types of sounds, for example, male voices, female voices, noises, singing voices, whistle, animal sounds, and cheers.

If audio event detection needs to be performed on an audio, framing processing needs to be performed on the to-be-checked audio. Specifically, the framing processing may be performed on the audio at an interval of N seconds. N is a positive integer and may be set according to an actual demand. For example, for a 10-second audio, an interval of framing may be set to 1 second, and after the framing processing, ten 1-second audios may be obtained and arranged based on a time sequence in the audio, and numbered as different moments in sequence.

The specified feature vector may be a vector formed by at least one pre-specified feature. The specified feature may include an FBANK feature, an energy feature, a base frequency feature, and an eigenvoice feature. It may be understood that, detection of an audio event in a manner of combining vectors of various types of features may be more adapted to audio detection in a complicated environment compared with detection of an audio event by using a single type of features. Thus, the present embodiment may detect the audio event more accurately, and avoid confusion among similar audio events.

According to an embodiment, the RNN/BI-RNN obtained through training may be used to detect an audio event. An RNN model, when performing audio event detection, not only uses information at a current moment, but also uses information at a moment before the current moment. Furthermore, besides using the information at the current moment and the information at the moment before the current moment, the BI-RNN model further uses information at a moment after the current moment. Therefore, the RNN/BI-RNN model has a stronger learning ability than GMM and SVM, and using the RNN/BI-RNN model to detect an audio event may achieve better detection effects.

Figure 10:
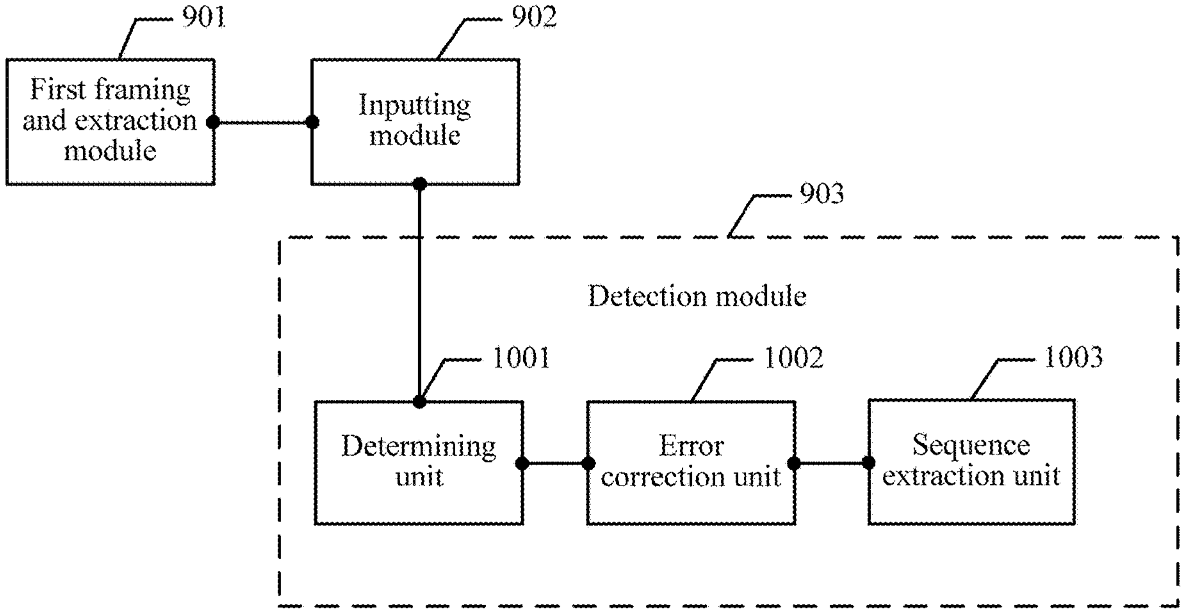
FIG. 10 is another schematic structural diagram of a program module of an audio event detection apparatus according to an embodiment.

FIG. 10 is a schematic diagram of a program module of an audio event detection apparatus according to an embodiment, including, as shown in the embodiment of FIG. 9, the first framing and extraction module 901, the inputting module 902, and the detection module 903, which are similar to those described in the embodiment of FIG. 9.

According to an embodiment, the detection module 903 may include a determining unit 1001 configured to respectively determine an audio event having a maximum posterior probability in the audio data of each time period, and taking the audio event having a maximum posterior probability as an initial audio event at a corresponding moment; an error correction unit 1002 configured to perform error correction processing on the initial audio event of each time period according to a preset Viterbi decoding algorithm to obtain a target audio event of each time period; and a sequence extraction unit 1003 configured to extract the optimal audio data sequence of the target audio event from the audio data of each time period based on a continuity of the target audio event of each time period.

The Viterbi decoding algorithm may be used to perform an error correction on a target audio event of each time period, and the algorithm may determine an initial audio event of each time period in sequence to avoid a situation in which the audio event corresponding to the maximum posterior probability at the current moment is used as a final result to determine an optimal audio data sequence. For example, at moments t−1, t, and t+1, the posterior probabilities of men voices may be 0.3, 0.6, and 0.3, respectively, and the posterior probabilities of women voices may be 0.5, 0.5, and 0.5, respectively. The initial audio events of the three moments may be, respectively, woman voice, man voice, and woman voice. However, generally, the types of the audio events should be continuous in three continuous moments, in such a situation, after the Viterbi algorithm is used, the target audio events at the three moments are, respectively, woman voice, woman voice, and woman voice.

After the initial audio event of each time period is obtained by using the trained RNN/BI-RNN model, the error correction may be performed on the initial audio event of each time period by using the Viterbi decoding algorithm to obtain the target audio event of each time period, avoid misjudgment on an audio event at a certain moment, and achieve better detection effects of an audio event.

Figure 11:
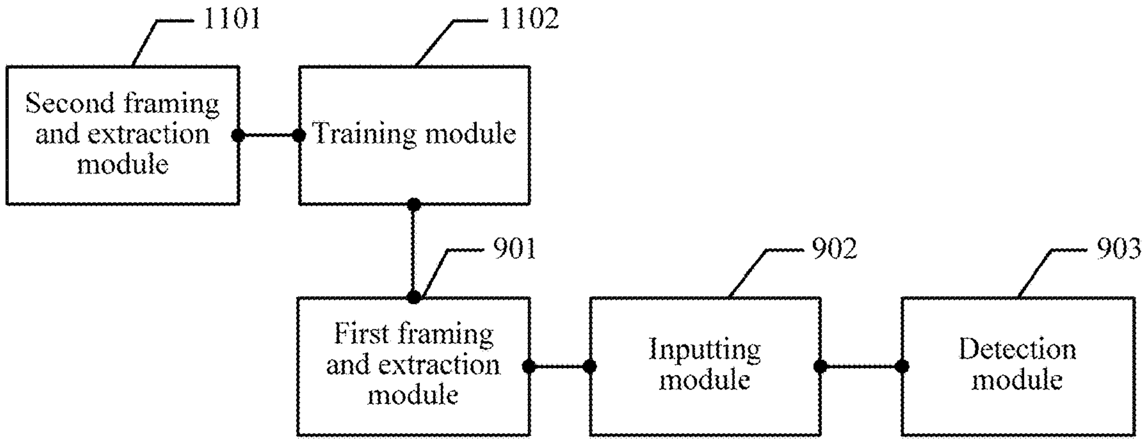
FIG. 11 is another schematic structural diagram of a program module of an audio event detection apparatus according to an embodiment.

FIG. 11 is another schematic diagram of a program module of an audio event detection apparatus according to an embodiment, including, as shown in the embodiment of FIG. 9, the first framing and extraction module 901, the inputting module 902, and the detection module 903, which are similar to those described in the embodiment of FIG. 9.

The program module may further include a second framing and extraction module 1101 configured to perform framing processing on the training audio to obtain training audio data of each time period in the training audio and respectively extracting a specified feature vector from the training audio data of each time period; and a training module 1102 configured to input the specified feature vector from the training audio data of each time period to a to-be-trained RNN/BI-RNN model and perform iterative training based on each preset audio event to obtain a trained RNN/BI-RNN model.

Figure 12:
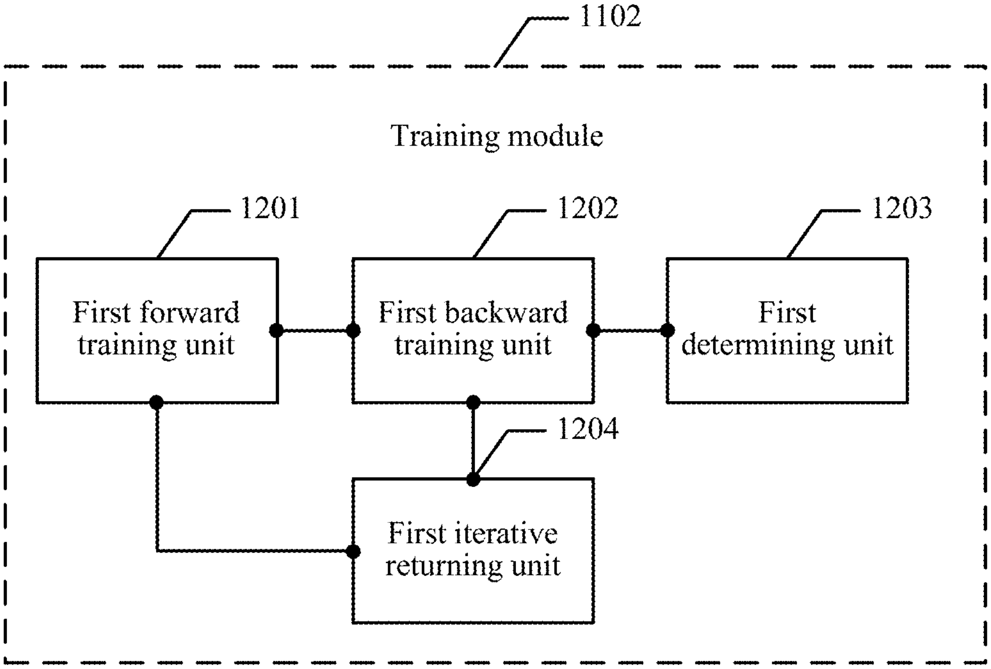
FIG. 12 is a schematic structural diagram of a program module of a training module according to an embodiment.

FIG. 12 is a schematic structural diagram of a program module of a training module 1102 according to an embodiment. The program module may include a first forward training unit 1201 configured to input the specified feature vector of the training audio data of each time period to a to-be-trained $RNN_m$ model and perform a forward propagation training on a forward hidden layer to obtain a training probability of each audio event in the training audio data of each time period output by the $RNN_m$ model, where m is a quantity of times that the RNN model has been trained, an initial value is 0, and an $RNN_0$ model is an initial to-be-trained model.

An RNN model that is not trained may be referred to as an initial to-be-trained model and may be marked as an $RNN_0$ model. 0 represents that a number of times that the $RNN_0$ model has been trained. If m is a number of times that the RNN model has been trained, an $RNN_m$ model that has been trained for m times is obtained. It should be noted that, a weight of each node in the $RNN_0$ model may be set in advance.

A specified feature vector of training audio data of each time period may be input to the to-be-trained $RNN_m$ model and a forward propagation training may be performed on a forward hidden layer to obtain a training probability of each audio event in the training audio data of each time period output by the $RNN_m$ model.

The forward propagation at a moment t may be taken as an example. The following formulas may be specifically used for the forward propagation training:

$$a_h^t = \sum_{i=1}^{I} w_{ih} x_i^t + \sum_{h'=1}^{H} w_{h'h} b_{h'}^{t-1}$$

$$b_h^t = f(a_h^t) = \exp(a_h^t) \Big/ \sum_{k'=1}^{K} \exp(a_h^t)$$

$a_h^t$ represents a value at a $h^{th}$ node at a moment t, I represents a total quantity of dimensions of a specified feature vector at the moment t, $w_{th}$ represents a weight of a $i^{th}$ dimension at the h node, $x_i^t$ represents a feature value of the $i^{th}$ dimension in the specified feature vector at the moment t, H represents a total quantity of nodes of a hidden layer in the RNN/BI-RNN model, $w_{h'h}$ represents a weight of a $h'^{th}$ node to the $h^{th}$ node, $b_h^t$ represents an output value of the specified feature vector at the $h^{th}$ node at the moment t, and K represents a total quantity of preset audio events.

A first backward training unit 1202 is configured to perform a backward propagation training on the forward hidden layer of the $RNN_m$ model based on the training probability of each audio event in the training audio data of each time period and a preset reverse propagation BPTT algorithm, and update a weight of each node in the $RNN_m$ model to obtain an updated $RNN_{m+1}$ model, where a weight of each node in the $RNN_0$ model is a preset value.

The moment t may be taken as an example, and the reverse propagation training may update a weight of a node by using following formulas:

$$BPTT \text{ algorithm: } \delta_h^t = f'(a_h^t)\left(\sum_{k=1}^{K} \delta_k^t w_{hk} + \sum_{h'=1}^{H} \delta_{h'}^{t+1} w_{hh'}\right)$$

$$\text{Gradient algorithm of a weight: } \frac{\partial O}{\partial w_{ih}^t} = \sum_{t=1}^{T} \delta_h^t b_{ih}^t$$

-continued $$\text{Updating algorithm of a weight: } w_{ih}^{t+1} = w_{ih}^t - \eta \frac{\partial O}{\partial w_{ih}^{t+1}}$$

$\delta_h^t$ represents an output value at the $h^{th}$ node at a moment t obtained based on the BPTT algorithm, f' represents a preset excitation function, $a_h^t$ represents a value at the $h^{th}$ node at the moment t in the forward propagation training, K represents a total quantity of preset audio events, $\delta_k^t$ represents an output value of a $k^{th}$ audio event on an output layer at the moment t, $w_{hk}$ represents a weight of the $k^{th}$ audio event at the $h^{th}$ node, H represents a total quantity of nodes in a hidden layer in an RNN/BI-RNN model, and $w_{h'h}$ represents a weight from a $h'^{th}$ node to the $h^{th}$ node.

$$\frac{\partial O}{\partial w_{ih}^t}$$

represents a gradient of a weight of a $i^{th}$ dimension of the specified feature vector at the $h^{th}$ node at the moment t.

T represents a total quantity of moments, $b_{th}^t$ represents an output value of the $i^{th}$ dimension of the specified feature vector at the $h^{th}$ node at the moment t, $w_{th}^{t+1}$ represents an updated weight of the $i^{th}$ dimension of the specified feature vector at the $h^{th}$ node at a moment t+1, and 7 represents a learning rate, where a value of t is decreased from T.

$$\delta_k^t = b_k^t - z_k^t$$

$\delta_k^t$ represents an output value of a $k^{th}$ audio event at an output layer at the moment t, $b^t$ represents a training probability of outputting a node in the hidden layer adjacent to an output node at the moment t to the $k^{th}$ audio event of the output node, $z_k^t$ represents a target probability of the $k^{th}$ audio event of the preset output node at the moment t. That is, $\delta_k^t$ represents an error value.

O represents a target function, and the target function may be a minimum mean square error or a maximum interactive entropy. The interactive entropy may be defined as:

$$O = -\sum_{k=1}^{K} z_k \log b_k$$

K represents a total quantity of preset audio events, $z_k$ represents a collection of a target probability of each audio event output by an output node of each time period that is preset, and $b_k$ represents a collection of a training probability of a $k^{th}$ audio event finally output by the forward propagation.

A first determining unit 1203 may be configured to take the $RNN_{m+1}$ model as a trained RNN model if it is determined to stop iterative training based on the $RNN_{m+1}$ model.

A first iterative returning unit 1204 may be configured to make m=m+1 if it determines to continue the iterative training based on the $RNN_{m+1}$ model, and may return to the first forward training unit 1201.

After the $RNN_{m+1}$ model is obtained, the first iterative returning unit 1204 determines whether to stop the iterative training. Specifically, a standard audio may be used, and the framing processing may be performed on the standard audio to obtain standard audio data of each time period. The specified feature vector may be extracted from the standard audio data of each time period, the specified feature vector of the standard audio data of each time period is input to the $RNN_{m+1}$ model to obtain an output value of each audio event of each time period that is output. An output value of each audio event of each time period may be respectively compared with a preset standard value of each audio event of each time period to obtain a difference, a maximum value of absolute values of all the differences compared with a preset difference. The iterative training may be determined to be continued if the maximum value is greater than or equal to the preset difference, and the iterative training is determined to be stopped if the maximum value is less than the preset difference.

According to this embodiment of the present disclosure, the iterative training is performed on the RNN model to obtain a better RNN model in a multi-iteration manner and achieve better detection effects when performing audio event detection by using the RNN model.

Figure 13:
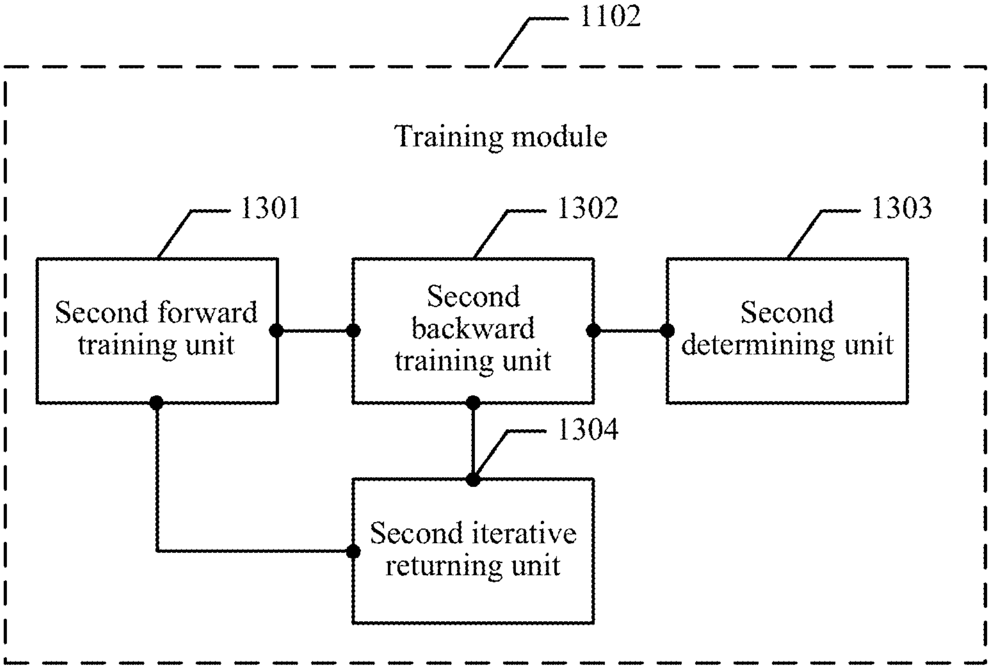
FIG. 13 is another schematic structural diagram of a program module of a training module according to an embodiment.

FIG. 13 is a schematic structural diagram of a refinement program module of a training module 1102 according to an embodiment. The training module 1102 may include a second forward training unit 1301 configured to input the specified feature vector of the training audio data of each time period to a to-be-trained BI-$RNN_m$ model and respectively perform forward propagation training on a forward hidden layer and forward propagation training on a backward hidden layer to obtain a first training probability and a second training probability of each audio event in the training audio data of each time period output by the BI-$RNN_m$ model, where m is a quantity of times that the BI-$RNN_m$ model has been trained, an initial value is 0, and a BI-$RNN_0$ model is an initial to-be-trained model.

A BI-RNN model that is not trained may be referred to as an initial to-be-trained model and may be marked as a BI-$RNN_0$ model. 0 represents that a number of times that the BI-$RNN_0$ model has been trained. If m is a number of times that the BI-$RNN_m$ model has been trained, the BI-$RNN_m$ model that has been trained for m times may be obtained, and an initial value of m is 0. It should be noted that, a weight of each node in the $RNN_0$ model may be set in advance.

The forward hidden layer refers to a hidden layer during propagation from a moment 1 to a moment T, and the regression hidden layer refers to a hidden layer during propagation from the moment T to the moment 1.

The forward propagation training is performed on the forward hidden layer from t=1 to t=T by using the specified feature vector of the training audio data of each time period, to obtain a first training probability of each audio event in the training audio data of each time period, and the forward propagation training is performed on the regression hidden layer from t=T to t=1, to obtain a second training probability of each audio event in the training audio data of each time period.

The forward propagation training on the forward hidden layer or the forward propagation training on the regression hidden layer may use following formulas:

$$a_h^t = \sum_{i=1}^{I} w_{ih} x_i^t + \sum_{h'=1}^{H} w_{h'h} b_{h'}^{t-1}$$

$$b_h^t = f(a_h^t) = \exp(a_h^t) \Big/ \sum_{k'=1}^{K} \exp(a_h^t)$$

$a_h^t$ represents a value at a $h^{th}$ node at a moment t, I represents a total quantity of dimensions of a specified feature vector at the moment t, $w_{th}$ represents a weight of a $i^{th}$ dimension at the $h^{th}$ node, $x_i^t$ represents a feature value of the $i^{th}$ dimension in the specified feature vector at the moment t, H represents a total quantity of nodes of a hidden layer in the RNN/BI-RNN model, $w_{h'h}$ represents a weight of a $h'^{th}$ node to the $h^{th}$ node, $b_h^t$ is a function of $a_h^t$ and represents an output value of the specified feature vector at the $h^{th}$ node at the moment t, and K represents a total quantity of preset audio events.

A second backward training unit 1302 may be configured to perform backward propagation training on the BI-$RNN_m$ model based on a third training probability of each audio event in the training audio data of each time period and a preset BPTT algorithm, respectively update a weight of each node in the forward hidden layer and a weight of each node in the backward hidden layer to obtain an updated BI-$RNN_{m+1}$ model, where the third training probability is a sum of the first training probability and the second training probability, and a weight of each node in an $RNN_0$ model is a preset value.

For example, at a moment t, the backward propagation training on the forward hidden layer or the backward propagation training on the regression hidden layer may use following formulas:

$$BPTT \text{ algorithm: } \delta_h^t = f'(a_h^t)\left(\sum_{k=1}^{K} \delta_k^t w_{hk} + \sum_{h'=1}^{H} \delta_{h'}^{t+1} w_{hh'}\right)$$

$$\text{Gradient algorithm of a weight: } \frac{\partial O}{\partial w_{ih}^t} = \sum_{t=1}^{T} \delta_h^t b_{ih}^t$$

$$\text{Updating algorithm of a weight: } w_{ih}^{t+1} = w_{ih}^t - \eta \frac{\partial O}{\partial w_{ih}^{t+1}}$$

$\delta_h^t$ represents an output value at the $h^{th}$ node at a moment t obtained based on the BPTT algorithm, $f'$ represents a preset excitation function, $a_h^t$ represents a value at the $h^{th}$ node at the moment t in the forward propagation training, K represents a total quantity of preset audio events, $\delta_k^t$ represents an output value of a $k^{th}$ audio event on an output layer at the moment t, $w_{hk}$ represents a weight of the $k^{th}$ audio event at the $h^{th}$ node, H represents a total quantity of nodes in a hidden layer in an RNN/BI-RNN model, and $w_{h'h}$ represents a weight from a $h'^{th}$ node to the $h^{th}$ node.

$$\frac{\partial O}{\partial w_{ih}^t}$$

represents a gradient of a weight of a $i^{th}$ dimension of the specified feature vector at the $h^{th}$ node at the moment t.

T represents a total quantity of moments, $b_{th}^t$ represents an output value of the $i^{th}$ dimension of the specified feature vector at the $h^{th}$ node at the moment t, $w_{th}^{t+1}$ represents an updated weight of the $i^{th}$ dimension of the specified feature vector at the $h^{th}$ node at a moment t+1, and η represents a learning rate, where a value of t is decreased from T.

$$\delta_k^t = b_k^t - z_k^t$$

$\delta_k^t$ represents an output value of a $k^{th}$ audio event at an output layer at the moment t, $b^t$ represents a third raining probability of outputting a node in the hidden layer adjacent to an output node at the moment t to the $k^{th}$ audio event of the output node, $z_k^t$ represents a target probability of the $k^{th}$ audio event of the preset output node at the moment t. That is, $\delta_k^t$ represents an error value.

O represents a target function, the target function may be a minimum mean square error or a maximum interactive entropy. The interactive entropy may be defined as:

$$O = -\sum_{k=1}^{K} z_k \log b_k$$

K represents a total quantity of preset audio events, $z_k$ represents a collection of a target probability of each audio event output by an output node of each time period that is preset, and $b_k$ represents a collection of a training probability of a $k^{th}$ audio event finally output by the forward propagation.

A second determining unit 1303 may be configured to take the $\text{BI-RNN}_{m+1}$ model as a trained BI-RNN model if it is determined to stop iterative training based on the $\text{BI-RNN}_{m+1}$ model.

A second iterative returning unit 1304 may be configured to make m=m+1 if it determines to continue the iterative training based on the $\text{BI-RNN}_{m+1}$ model, and return to perform the second backward training unit 1301.

After the $\text{BI-RNN}_{m+1}$ model is obtained, whether to stop the iterative training is determined. Specifically, a standard audio may be used, and the framing processing may be performed on the standard audio to obtain standard audio data of each time period. The specified feature vector may be extracted from the standard audio data of each time period, the specified feature vector of the standard audio data of each time period is input to the $\text{BI-RNN}_{m+1}$ model to obtain an output value of each audio event of each time period that is output. An output value of each audio event of each time period is respectively compared with a preset standard value of each audio event of each time period to obtain a difference, a maximum value of absolute values of all the differences compared with a preset difference, the iterative training may be determined to be continued if the maximum value is greater than or equal to the preset difference, and the iterative training is determined to be stopped if the maximum value is less than the preset difference.

According to an embodiment, the iterative training may be performed on the BI-RNN model to obtain a better BI-RNN model in a multi-iteration manner and achieve better detection effects when performing audio event detection by using the BI-RNN model.

An embodiment of the present disclosure further provides a terminal device, including a memory, a processor, and a computer program stored in the memory and run on the processor. When the computer program is executed by the processor, each step of the audio event detection method in the embodiments shown in FIGS. 4 to 6 may be implemented.

An embodiment of this application further provides a computer-readable storage medium, storing a computer program, and when being executed by the processor, the computer program implementing each step of the audio event detection method in the embodiments shown in FIGS. 4 to 6.

It should be understood that the disclosed apparatus and method may be implemented in different manners. For example, the described apparatus embodiments are merely examples. For example, division of the modules is merely logical function division and may be other division manners during actual implementation. For example, a plurality of modules or components may be combined or integrated into another system, or some features may be ignored or not performed. In addition, the displayed or disclosed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all modules thereof may be selected based on an actual requirement to implement an objective of the solution in an embodiment.

In addition, functional modules in the embodiments of the present disclosure may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the existing technology, or all or some of the technical solutions may be implemented in the form of a software product. The software product may be stored in a storage medium and may include several instructions for instructing a computer device (which may be a personal computer, a server, or a network device) to perform all or some of the steps of the methods described in the embodiments of the present disclosure. The foregoing storage medium may include any medium that can store program code, such as a USB flash memory drive, a removable hard disk, a read-only memory (ROM), a random access memory (RAM), a magnetic disk, or an optical disc.

It should be noted that the foregoing method embodiments are represented as a series of actions. However, a person skilled in the art should appreciate that the present disclosure is not limited to the described order of the actions, because some steps may be performed in other orders or simultaneously. It should be further appreciated by a person skilled in the art that the actions and modules in the embodiments described herein are not necessarily required.

In the foregoing embodiments, the description of each embodiment has respective focuses. For a part that is not described in detail in an embodiment, reference may be made to related descriptions in other embodiments.

Detailed above are the audio event detection method and apparatus, and the computer-readable storage medium. A person skilled in the art may make modifications to the specific implementations and application scopes according to the ideas of the embodiments of the present disclosure. The contents provided herein should not be construed as a limitation to the present disclosure.

What is claimed is:

1. An audio event detection method, the method comprising:

performing a framing processing on an audio to obtain audio data for each of a plurality of time periods in the audio and respectively extracting a specified feature vector from the audio data for each of the plurality of time periods;

inputting the specified feature vector of the audio data of each of the plurality of time periods to a Recurrent Neural Network/Bidirectional Recurrent Neural Network (RNN/BI-RNN) model, to obtain a posterior probability of each pre-set audio event in the audio data for each of the plurality of time periods;

training the RNN/BI-RNN model including:

inputting a specified training feature vector of a training audio data of each of the plurality of time periods to a to-be-trained BI-$RNN_m$ model and respectively performing a forward propagation training on a forward hidden layer and the forward propagation training on a backward hidden layer, to obtain a first training probability and a second training probability of each audio event in the training audio data of each of the plurality of time periods output by the to-be-trained BI-$RNN_m$ model, wherein m is a number of times that the to-be-trained BI-$RNN_m$ model has been trained, and wherein a BI-$RNN_o$ model is an initial BI-RNN model;

performing a backward propagation training on the BI-$RNN_m$ model based on a third training probability of each audio event in the training audio data of each of the plurality of time periods and a preset reverse propagation BPTT algorithm, and respectively updating a weight each node in the forward hidden layer and a weight of each node in the backward hidden layer, to obtain an updated BI-$RNN_{m+1}$ model, wherein the third training probability is a sum of the first training probability and the second training probability, and a weight of each node in the BI-$RNN_o$ model is a first preset value;

obtaining, for each of the plurality of time periods, a target audio event of the audio data according to the posterior probability of each pre-set audio event in the audio data and a pre-set audio decoding algorithm; and extracting, for the target audio event of any one of the plurality of time periods, an optimal audio data sequence of the target audio event from the audio data of each of the plurality of time periods, wherein the obtaining, for each of the plurality of time periods, the target audio event of the audio data further comprises:

respectively determining an audio event having a maximum posterior probability in the audio data for each of the plurality of time periods, and setting the audio event having the maximum posterior probability as an initial audio event at a corresponding moment; and performing an error correction processing on the initial audio event according to a preset Viterbi decoding algorithm to obtain the target audio event for each of the plurality of time periods, and wherein the extracting, for the target audio event of any one of the plurality of time periods, the optimal audio data sequence of the target audio event further comprises:

extracting the optimal audio data sequence of the target audio event from the audio data of each of the plurality of time periods based on a continuity of the target audio event of each of the plurality of time periods, such that types of first target audio events among a plurality of target audio events determined as a first optimal audio data sequence are arranged in first consecutive moments and types of second target audio events among the plurality of target audio events determined as a second optimal audio data sequence are arranged in second consecutive moments.

2. The method according to claim 1, further comprising:

performing the framing processing on a training audio to obtain the training audio data of each of the plurality of time periods in the training audio and respectively extracting the specified training feature vector from the training audio data of each of the plurality of time periods; and inputting the specified training feature vector of the training audio data of each of the plurality of time periods to the to-be-trained RNN/BI-RNN model and performing an iterative training based on each preset audio event, to obtain the RNN/BI-RNN model.

3. The method according to claim 2, wherein the inputting the specified training feature vector of the training audio data of each of the plurality of time periods to the to-be-trained RNN/BI-RNN model and performing the iterative training based on each preset audio event further comprises:

inputting the specified training feature vector of the training audio data of each of the plurality of time periods to a to-be-trained $RNN_m$ model and performing a forward propagation training on a forward hidden layer to obtain a training probability of each audio event in the training audio data of each of the plurality of time periods output by the to-be-trained $RNN_m$ model, wherein m is a number of times that the to-be-trained $RNN_m$ model has been trained, and wherein an $RNN_0$ model is an initial RNN model;

performing a backward propagation training on the forward hidden layer of the $RNN_m$ model based on the training probability of each audio event in the training audio data of each of the plurality of time periods and the preset reverse propagation BPTT algorithm, and updating a weight of each node in the $RNN_m$ model to obtain an updated $RNN_{m+1}$ model, wherein a weight of each node in the $RNN_0$ model is a second preset value; and setting the updated $RNN_{m+1}$ model as a trained RNN model based on determining to stop the iterative training on the $RNN_{m+1}$ model; and updating m=m+1 based on determining to continue the iterative training on the $RNN_{m+1}$ model and returning to perform the inputting the specified training feature vector of the training audio data of each of the plurality of time periods to the to-be-trained $RNN_m$ model.

4. The method according to claim 2, wherein the inputting the specified training feature vector of the training audio data of each of the plurality of time periods to the to-be-trained RNN/BI-RNN model and performing the iterative training based on each preset audio event further comprises:

setting the BI-$RNN_{m+1}$ model as a trained BI-RNN model based on determining to stop the iterative training on the BI-$RNN_{m+1}$ model; and updating m=m+1 based on determining to continue the iterative training on the BI-$RNN_{m+1}$ model and returning to perform the inputting the specified training feature vector of the training audio data of each of the plurality of time periods to the to-be-trained BI-$RNN_m$ model.

5. The method according to claim 4, wherein the forward propagation training is performed by using following formulas:

$$a_h^t = \sum_{i=1}^{I} w_{ih} x_i^t + \sum_{h'=1}^{H} w_{h'h} b_{h'}^{t-1}$$

-continued $$b_h^t = f(a_h^t) = \exp(a_h^t) \Big/ \sum_{k'=1}^{K} \exp(a_h^t)$$

wherein $\alpha_h^t$ represents a value of a $h^{th}$ node in the RNN/BI-RNN model at a moment t, I represents a total quantity of dimensions of the specified feature vector at the moment t, $w_{ih}$ represents a weight of a $i^{th}$ dimension at the $h^{th}$ node, $x_i^t$ represents a feature value of the $i^{th}$ dimension in the specified feature vector at the moment t, H represents a total quantity of nodes of a hidden layer in the RNN/BI-RNN model, $w_{h'h}$ represents a weight of a $h'^{th}$ node to the $h^{th}$ node, $b_h^t$ represents an output value of the specified feature vector at the $h^{th}$ node at the moment t, and K represents a total quantity of preset audio events.

6. The method according to claim 4, wherein the backward propagation training on the BI-RNN$_m$ model updates a weight of a node by using following formulas:

$$\text{a } BPTT \text{ algorithm: } \delta_h^t = f'(a_h^t)\left(\sum_{k=1}^{K} \delta_k^t w_{hk} + \sum_{h'=1}^{H} \delta_{h'}^{t+1} w_{hh'}\right)$$

$$\text{a gradient algorithm of a weight: } \frac{\partial O}{\partial w_{ih}^t} = \sum_{t=1}^{T} \delta_h^t b_{ih}^t$$

$$\text{an updating algorithm of a weight: } w_{ih}^{t+1} = w_{ih}^t - \eta \frac{\partial O}{\partial w_{ih}^{t+1}}$$

wherein $\delta_h^t$ represents an output value at a $h^{th}$ node at a moment t obtained based on the BPTT algorithm, f' represents a preset excitation function, $\alpha_h^t$ represents a value at the $h^{th}$ node at the moment t in the forward propagation training, K represents a total quantity of preset audio events, $\delta_k^t$ represents an output value of a $k^{th}$ audio event on an output layer at the moment t, $w_{hk}$ represents a weight of the $k^{th}$ audio event at the $h^{th}$ node, H represents a total quantity of nodes in a hidden layer in an RNN/BI-RNN model, and $w_{h'h}$ represents a weight from a $h'^{th}$ node to the $h^{th}$ node;

$$\frac{\partial O}{\partial w_{ih}^t}$$

represents a gradient of a weight of a $i^{th}$ dimension of the specified feature vector at the $h^{th}$ node at the moment t;

T represents a total quantity of moments, $b_{ih}^t$ represents an output value of the $i^{th}$ dimension of the specified feature vector at the $h^{th}$ node at the moment t, $w_{ih}^{t+1}$ represents an updated weight of the $i^{th}$ dimension of the specified feature vector at the $h^{th}$ node at a moment t+1, and $\eta$ represents a learning rate; wherein a value of t decreases from T.

7. The method according to claim 4, wherein the determining to stop the iterative training and the determining to continue the iterative training comprise:

respectively obtaining a difference between an output value of each audio event output by the BI-RNN$_{m+1}$ model and a preset standard value of each audio event, comparing a maximum absolute value of the differences with a preset difference, determining to continue the iterative training if the maximum absolute value is greater than or equal to the preset difference, or determining to stop the iterative training if the maximum absolute value is less than the preset difference.

8. The method according to claim 6, wherein O represents a target function, the target function being a minimum mean square error or a maximum interactive entropy, calculated based on an equation:

$$O = -\sum_{k=1}^{K} z_k \log b_k$$

wherein $z_k$ represents a collection of a target probability of each audio event output by an output node of each of the plurality of time periods that is preset.

9. An audio event detection apparatus, comprising:

at least one memory configured to store computer program code; and at least one processor configured to access the computer program code and operate as instructed by the computer program code, the computer program code comprising:

first framing and extraction code configured to cause the at least one processor to perform a framing processing on an audio to obtain audio data for each of a plurality of time periods in the audio and respectively extract a specified feature vector from the audio data for each of the plurality of time periods;

inputting code configured to cause the at least one processor to input the specified feature vector of the audio data of each of the plurality of time periods to a Recurrent Neural Network/Bidirectional Recurrent Neural Network (RNN/BI-RNN) model, to obtain a posterior probability of each pre-set audio event in the audio data for each of the plurality of time periods;

training code configured to cause the at least one processor to:

input a specified training feature vector of a training audio data of each of the plurality of time periods to a to-be-trained BI-RNN$_m$ model and respectively performing a forward propagation training on a forward hidden layer and the forward propagation training on a backward hidden layer, to obtain a first training probability and a second training probability of each audio event in the training audio data of each of the plurality of time periods output by the to-be-trained BI-RNN$_m$ model, wherein m is a number of times that the to-be-trained BI-RNN$_m$ model has been trained, and wherein a BI-RNN$_0$ model is an initial BI-RNN model;

perform a backward propagation training on the BI-RNN$_m$ model based on a third training probability of each audio event in the training audio data of each of the plurality of time periods and a preset reverse propagation BPTT algorithm, and respectively updating a weight of each node in the forward hidden layer and a weight of each node in the backward hidden layer, to obtain an updated BI-RNN$_{m+1}$ model, wherein the third training probability is a sum of the first training probability and the second training probability, and a weight of each node in the BI-RNN$_0$ model is a first preset value;

detection code configured to cause at least one processor to obtain, for each of the plurality of time periods, a target audio event of the audio data according to the posterior probability of each pre-set audio event in the audio data and a pre-set audio decoding algorithm, and extract, for the target audio event of any one of the plurality of time periods, an optimal audio data sequence of the target audio event from the audio data of each of the plurality of time periods;

determining code configured to cause the at least one processor to respectively determine an audio event having a maximum posterior probability in the audio data of each of the plurality of time periods, and set the audio event having the maximum posterior probability as an initial audio event at a corresponding moment;

error correction code configured to cause the at least one processor to perform an error correction processing on the initial audio event according to a preset Viterbi decoding algorithm, to obtain the target audio event for each of the plurality of time periods; and sequence extraction code configured to cause the at least one processor to extract the optimal audio data sequence of the target audio event based on a continuity of the target audio event, such that types of first target audio events among a plurality of target audio events determined as a first optimal audio data sequence are arranged in first consecutive moments and types of second target audio events among the plurality of target audio events determined as a second optimal audio data sequence are arranged in second consecutive moments.

10. The apparatus according to claim 9, further comprising:

second framing and extraction code configured to cause the at least one processor to perform the framing processing on a training audio to obtain the training audio data of each of the plurality of time periods in the training audio, and respectively extracting the specified training feature vector from the training audio data of each of the plurality of time periods; and the training code is further configured to cause the at least one processor to input the specified training feature vector of the training audio data of each of the plurality of time periods to the to-be-trained RNN/BI-RNN model and perform an iterative training based on each preset audio event, to obtain the RNN/BI-RNN model.

11. The apparatus according to claim 10, wherein the training code further comprises:

first forward training code configured to cause the at least one processor to input the specified training feature vector of the training audio data of each of the plurality of time periods to a to-be-trained $RNN_m$ model and perform a forward propagation training on a forward hidden layer to obtain a training probability of each audio event in the training audio data of each of the plurality of time periods output by the to-be-trained $RNN_m$ model, wherein m is a number of times that the to-be-trained $RNN_m$ model has been trained, and wherein an $RNN_0$ model is an initial RNN model;

first backward training code configured to cause the at least one processor to perform a backward propagation training on the forward hidden layer of the $RNN_m$ model based on the training probability of each audio event in the training audio data of each of the plurality of time periods and the preset reverse propagation BPTT algorithm, and update a weight of each node in the $RNN_m$ model to obtain an updated $RNN_{m+1}$ model, wherein a weight of each node in the $RNN_0$ model is a second preset value;

first determining code configured to cause the at least one processor to set the updated $RNN_{m+1}$ model as a trained RNN model based on determining to stop the iterative training on the $RNN_{m+1}$ model; and first iterative returning code configured to cause the at least one processor to update m=m+1 based on determining to continue the iterative training on the $RNN_{m+1}$ model and return to the first forward training code.

12. The apparatus according to claim 10, wherein the training code further comprises:

second determining code configured to cause the at least one processor to set the $BI\text{-}RNN_{m+1}$ model as a trained BI-RNN model based on determining to stop the iterative training on the $BI\text{-}RNN_{m+1}$ model; and second iterative returning code configured to cause the at least one processor to update m=m+1 based on determining to continue the iterative training on the $BI\text{-}RNN_{m+1}$ model and return to perform the second backward training code.

13. The apparatus according to claim 12, wherein the forward propagation training is performed by using following formulas:

$$a_h^t = \sum_{i=1}^{I} w_{ih} x_i^t + \sum_{h'=1}^{H} w_{h'h} b_{h'}^{t-1}$$

$$b_h^t = f(a_h^t) = \exp(a_h^t) \Big/ \sum_{k'=1}^{K} \exp(a_h^t)$$

wherein $\alpha_h^t$ represents a value of a $h^{th}$ node in the RNN/BI-RNN model at a moment t, I represents a total quantity of dimensions of the specified feature vector at the moment t, $w_{th}$ represents a weight of a $i^{th}$ dimension at the $h^{th}$ node, $x_i^t$ represents a feature value of the $i^{th}$ dimension in the specified feature vector at the moment t, H represents a total quantity of nodes of a hidden layer in the RNN/BI-RNN model, $w_{h'h}$ represents a weight of a $h'^{th}$ node to the $h^{th}$ node, $b_h^t$ represents an output value of the specified feature vector at the $h^{th}$ node at the moment t, and K represents a total quantity of preset audio events.

14. The apparatus according to claim 12, wherein the backward propagation training on the $BI\text{-}RNN_m$ model updates a weight of a node by using following formulas:

$$\text{a } BPTT \text{ algorithm: } \delta_h^t = f'(a_h^t)\left(\sum_{k=1}^{K} \delta_k^t w_{hk} + \sum_{h'=1}^{H} \delta_{h'}^{t+1} w_{hh'}\right)$$

$$\text{a gradient algorithm of a weight: } \frac{\partial O}{\partial w_{ih}^t} = \sum_{t=1}^{T} \delta_h^t b_{ih}^t$$

$$\text{an updating algorithm of a weight: } w_{ih}^{t+1} = w_{ih}^t - \eta \frac{\partial O}{\partial w_{ih}^{t+1}}$$

wherein $\delta_h^t$ represents an output value at a $h^{th}$ node at a moment t obtained based on the BPTT algorithm, f' represents a preset excitation function, $\alpha_h^t$ represents a value at the $h^{th}$ node at the moment t in the forward propagation training, K represents a total quantity of preset audio events, $\delta_k^t$ represents an output value of a $k^{th}$ audio event on an output layer at the moment t, $w_{hk}$ represents a weight of the $k^{th}$ audio event at the $h^{th}$ node, H represents a total quantity of nodes in a hidden layer in an RNN/BI-RNN model, and $w_{h'h}$ represents a weight from a $h'^{th}$ node to the $h^{th}$ node;

$$\frac{\partial O}{\partial w_{ih}^{t}}$$

represents a gradient of a weight of a $i^{th}$ dimension of the specified feature vector at the $h^{th}$ node at the moment t;

T represents a total quantity of moments, $b_{th}{}^{t}$ represents an output value of the $i^{th}$ dimension of the specified feature vector at the $h^{th}$ node at the moment t, $w_{th}{}^{t+1}$ represents an updated weight of the $i^{th}$ dimension of the specified feature vector at the $h^{th}$ node at a moment t+1, and $\eta$ represents a learning rate; wherein a value of t decreases from T.

15. The apparatus according to claim 12, wherein the training code is further configured to respectively obtain a difference between an output value of each audio event output by the $\text{BI-RNN}_{m+1}$ model and a preset standard value of each audio event, compare a maximum absolute value of the differences with a preset difference, and determine to continue the iterative training if the maximum absolute value is greater than or equal to the preset difference or determine to stop the iterative training if the maximum absolute value is less than the preset difference.

16. The apparatus according to claim 14, wherein O represents a target function, the target function being a minimum mean square error or a maximum interactive entropy, calculated based on an equation:

$$O = -\sum_{k=1}^{K} z_k \log b_k$$

wherein $z_k$ represents a collection of a target probability of each audio event output by an output node of each of the plurality of time periods that is preset.

17. A non-transitory computer-readable storage medium, storing executable instructions, the executable instructions capable of causing a computer to:

perform a framing processing on an audio to obtain audio data for each of a plurality of time periods in the audio and respectively extract a specified feature vector from the audio data for each of the plurality of time periods;

input the specified feature vector of the audio data of each of the plurality of time periods to a Recurrent Neural Network/Bidirectional Recurrent Neural Network (RNN/BI-RNN) model, to obtain a posterior probability of each pre-set audio event in the audio data for each of the plurality of time periods, wherein a training of the RNN/BI-RNN model comprises:

inputting a specified training feature vector of a training audio data of each of the plurality of time periods to a to-be-trained $\text{BI-RNN}_m$ model and respectively performing a forward propagation training on a forward hidden layer and the forward propagation training on a backward hidden layer, to obtain a first training probability and a second training probability of each audio event in the training audio data of each of the plurality of time periods output by the to-be-trained $\text{BI-RNN}_m$ model, wherein m is a number of times that the to-be-trained $\text{BI-RNN}_m$ model has been trained, and wherein a $\text{BI-RNN}_0$ model is an initial BI-RNN model;

performing a backward propagation training on the $\text{BI-RNN}_m$ model based on a third training probability of each audio event in the training audio data of each of the plurality of time periods and a preset reverse propagation BPTT algorithm, and respectively updating a weight of each node in the forward hidden layer and a weight of each node in the backward hidden layer, to obtain an updated $\text{BI-RNN}_{m+1}$ model, wherein the third training probability is a sum of the first training probability and the second training probability, and a weight of each node in the $\text{BI-RNN}_0$ model is a first preset value;

obtain, for each of the plurality of time periods, a target audio event of the audio data according to the posterior probability of each pre-set audio event in the audio data and a pre-set audio decoding algorithm; and extract, for the target audio event of any one of the plurality of time periods, an optimal audio data sequence of the target audio event from the audio data of each of the plurality of time periods, wherein the executable instructions are further capable of causing the computer to:

determine an audio event having a maximum posterior probability in the audio data of each of the plurality of time periods, and set the audio event having the maximum posterior probability as an initial audio event at a corresponding moment; and perform an error correction processing on the initial audio event according to a preset Viterbi decoding algorithm, to obtain the target audio event for each of the plurality of time periods extract the optimal audio data sequence of the target audio event based on a continuity of the target audio event, such that types of first target audio events among a plurality of target audio events determined as a first optimal audio data sequence are arranged in first consecutive moments and types of second target audio events among the plurality of target audio events determined as a second optimal audio data sequence are arranged in second consecutive moments.

* * * * *